United States Patent
Murakami et al.

(10) Patent No.: US 11,919,371 B2
(45) Date of Patent: Mar. 5, 2024

(54) WINDOW STABILIZATION MECHANISM

(71) Applicant: Kubota Corporation, Osaka (JP)

(72) Inventors: Junichi Murakami, Sakai (JP); Yusuke Hada, Sakai (JP); Kohei Masui, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 602 days.

(21) Appl. No.: 17/218,166

(22) Filed: Mar. 31, 2021

(65) Prior Publication Data

US 2022/0032743 A1 Feb. 3, 2022

(30) Foreign Application Priority Data

Aug. 3, 2020 (JP) .................................. 2020-131702

(51) Int. Cl.
| | |
|---|---|
| *B60J 1/00* | (2006.01) |
| *B60J 1/02* | (2006.01) |
| *B60J 1/20* | (2006.01) |
| *B60J 1/17* | (2006.01) |

(52) U.S. Cl.
CPC ................. *B60J 1/007* (2013.01); *B60J 1/02* (2013.01); *B60J 1/2097* (2013.01); *B60J 1/17* (2013.01)

(58) Field of Classification Search
CPC ... B60J 1/007; B60J 1/02; B60J 1/2097; B60J 1/17
USPC ....................................................... 296/190.1
See application file for complete search history.

(56) References Cited

U.S. PATENT DOCUMENTS

| | | | |
|---|---|---|---|
| 8,016,345 B1 * | 9/2011 | Goddard | .................... B60J 5/02 296/146.13 |
| 8,303,026 B2 * | 11/2012 | Yamashita | ......... B62D 33/0617 296/146.16 |
| 2011/0233963 A1 | 9/2011 | Yamashita et al. | |

FOREIGN PATENT DOCUMENTS

| | | |
|---|---|---|
| JP | 58-73681 | 5/1983 |
| JP | 05-310040 | 11/1993 |
| JP | 07-076218 | 3/1995 |
| JP | 2000-291323 | 10/2000 |
| JP | 2007-170114 | 7/2007 |

(Continued)

OTHER PUBLICATIONS

Japanese Decision to Grant a Patent for corresponding JP Application No. 2020-131702, dated Oct. 10, 2023 (w/ machine translation).

(Continued)

*Primary Examiner* — Amy R Weisberg
*Assistant Examiner* — Dana D Ivey
(74) *Attorney, Agent, or Firm* — MORI & WARD, LLP

(57) ABSTRACT

A window stabilization mechanism includes a rail provided on a first cabin frame provided on one side of a window, and has a first end and a second end opposite to the first end in the lengthwise direction of the rail. A sliding member is provided on a windowpane and is configured to slide on the rail. The sliding member is located at a first end when the window is opened and at a second end when the window is closed. A lock mechanism is configured to lock the windowpane to the first cabin frame when the window is closed. A window support member is configured to abut on the windowpane when the window is closed, and to press the windowpane in an oblique direction from the windowpane toward the rail and from the second end toward the first end when the windowpane is locked by a lock mechanism.

20 Claims, 19 Drawing Sheets

(56) References Cited

FOREIGN PATENT DOCUMENTS

| JP | 2011-207287 | | 10/2011 |
| JP | 5275281 | B2 | 10/2011 |
| JP | 6209149 | B2 | 5/2016 |
| JP | 6300695 | B2 | 5/2016 |

OTHER PUBLICATIONS

Japanese Office Action for corresponding JP Application No. 2020-131702, dated Jul. 25, 2023 (w/ machine translation).

* cited by examiner

WINDOW STABILIZATION MECHANISM

CROSS-REFERENCE TO RELATED APPLICATIONS

The present application claims priority under 35 U.S.C. § 119 to Japanese Patent Application No. 2020-131702, filed Aug. 3, 2020. The contents of this application are incorporated herein by reference in their entirety.

BACKGROUND OF THE INVENTION

Field of the Invention

The present invention relates to a window stabilization mechanism.

Discussion of the Background

Japanese Patent No. 5275281 shows a front openable and closable window of a cabin of a work vehicle. The front window is provided with a locking means for regulating opening and closing.

SUMMARY OF THE INVENTION

According to one aspect of the present disclosure, a window stabilization mechanism includes a rail, a sliding member, a seal mechanism, and a lock mechanism. The rail is mounted on a first cabin frame provided on one side of a window of a cabin of a work vehicle. The sliding member is provided on a windowpane and is configured to slide on the rail to guide the windowpane in accordance with opening and closing of the window. The seal mechanism is mounted on the first cabin frame and configured to seal a gap between the first cabin frame and the windowpane when the window is closed. The lock mechanism is configured to lock the windowpane to the first cabin frame when the window is closed. The lock mechanism includes a seal frame body and a first additional elastic body. The seal frame body is an elastic body and has an internal space. The first additional elastic body is provided in the internal space. A first additional elastic body is not provided at a portion of the internal space of the seal frame body which is positioned adjacent to the lock mechanism when the window is closed.

According to a second aspect of the present disclosure, a window stabilization mechanism includes a rail, a sliding member, a lock mechanism, and a window support member. The rail is provided on a first cabin frame provided on one side of a window of a cabin of a work vehicle, and has a first end and a second end opposite to the first end in the lengthwise direction of the rail. The sliding member is provided on a windowpane and is configured to slide on the rail in accordance with opening and closing of the window to guide the window. The sliding member is located at a first end when the window is opened and at a second end when the window is closed. The lock mechanism is configured to lock the windowpane to the first cabin frame when the window is closed. The window support member is configured to abut on the windowpane when the window is closed, and to press the windowpane in an oblique direction from the windowpane toward the rail and from the second end toward the first end when the windowpane is locked by a lock mechanism.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
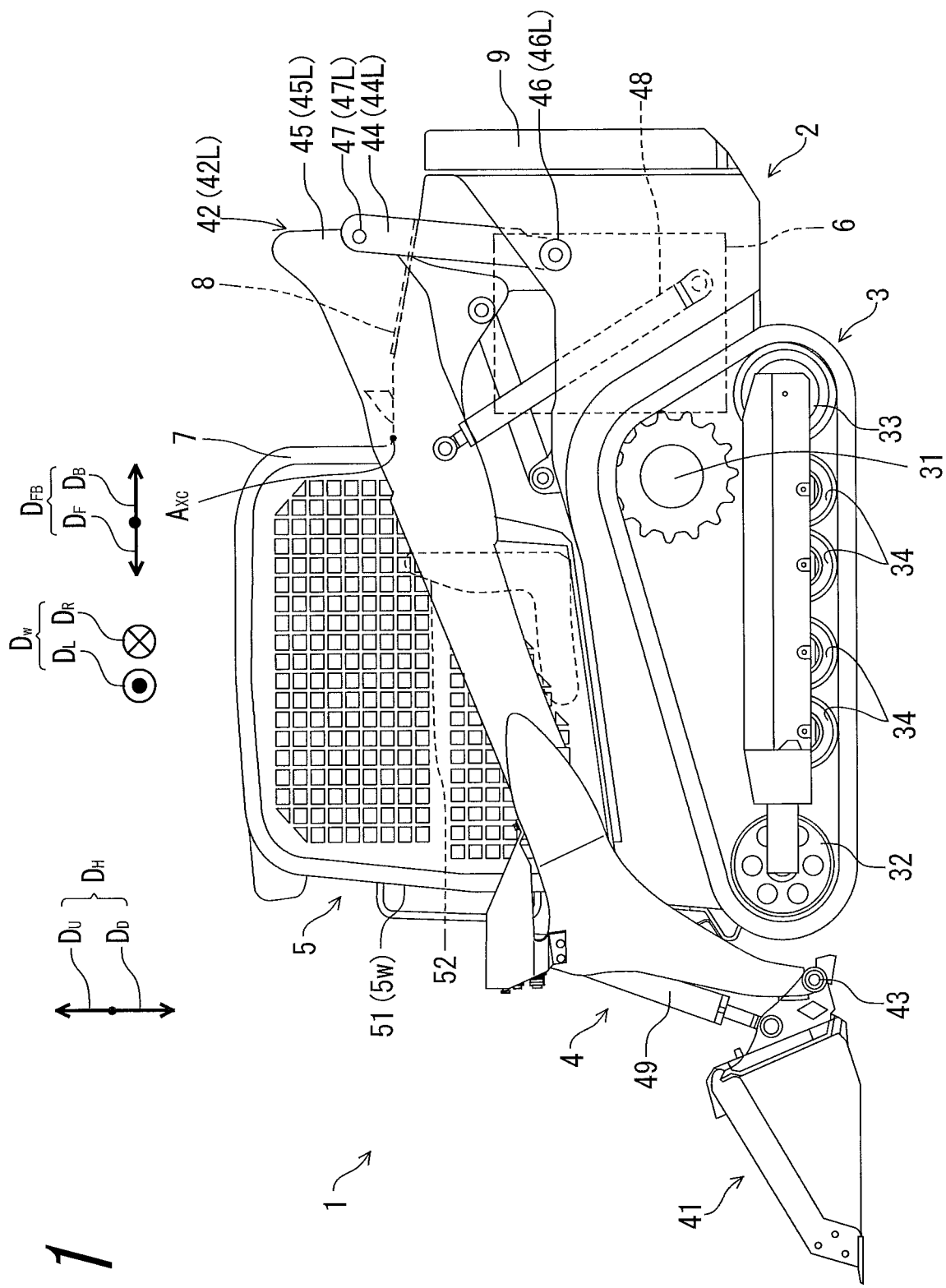
FIG. 1 is a side view of a work vehicle.

The embodiments will now be described with reference to the accompanying drawings, wherein like reference numerals designate corresponding or identical elements throughout the various drawings.

Hereinafter, the present invention will be specifically described with reference to the drawings showing embodiments thereof. In the drawings, like reference numerals denote corresponding or substantially identical configurations.

Embodiment

<Overall Composition>

Figure 2:
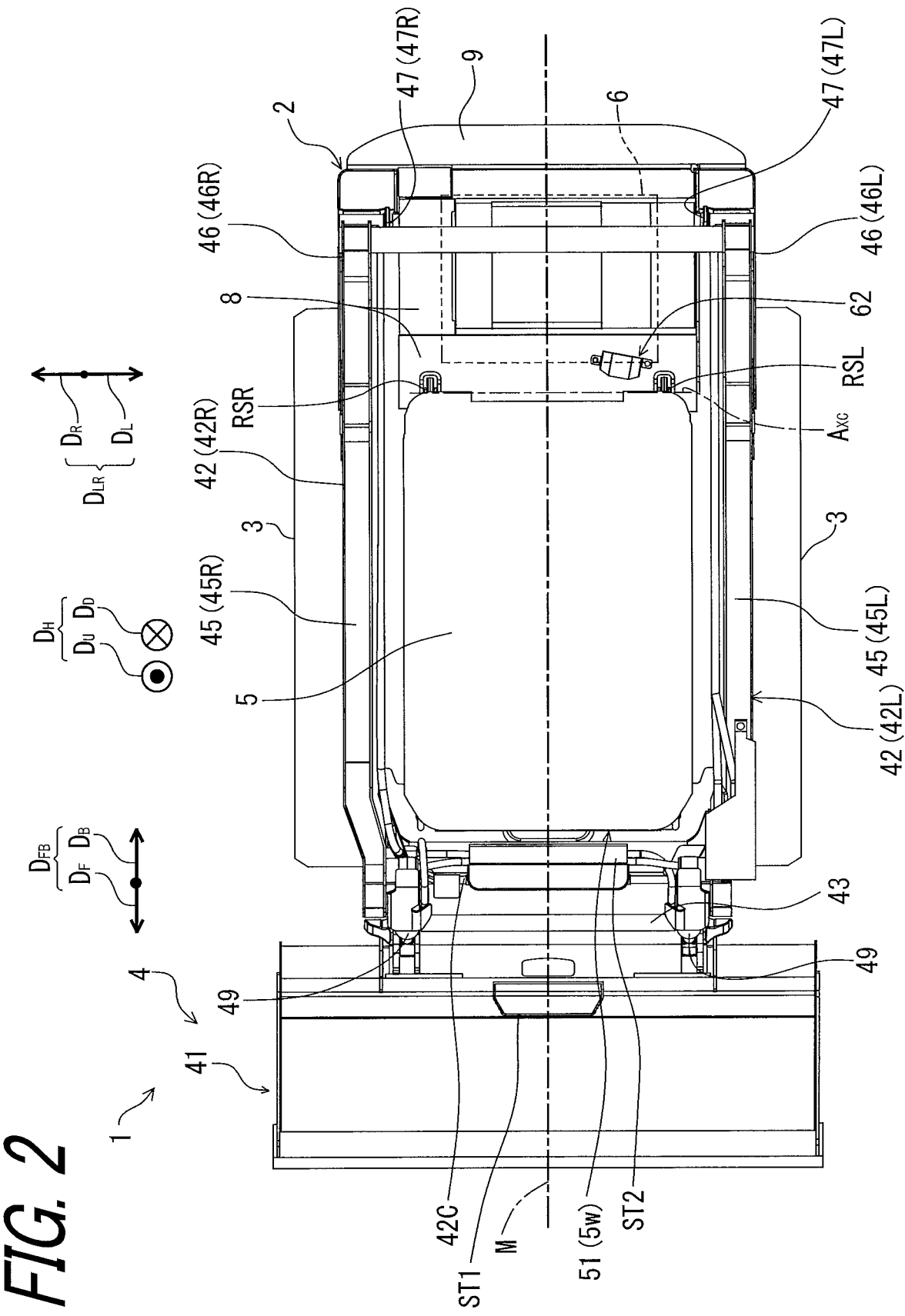
FIG. 2 is a top view of a work vehicle.

Referring to FIGS. 1 and 2, a work vehicle 1, such as a compact track loader, includes a vehicle body frame 2, a traveling device 3, a working device 4, and a cabin 5. The vehicle body frame 2 supports the traveling device 3, the working device 4, and the cabin 5. In the illustrated embodiment, the traveling device 3 is a crawler type traveling device. Therefore, the traveling device 3 includes a driving wheel 31, driven wheels 32 and 33, and a roller 34. However, the traveling device 3 is not limited to a crawler traveling device. The traveling device 3 may be, for example, a front-wheel/rear-wheel traveling device or a traveling device having a front wheel and a rear crawler. The working device 4 includes a work equipment 41 at the distal end of the working device 4. The work equipment 41 is, for example, a bucket. The proximal end of the working device 4 is attached to the rear part of the vehicle body frame 2. The working device 4 includes a pair of arm mechanisms 42 for rotatably supporting the bucket 41 through a bucket pivot shaft 43. Each of the pair of arm mechanisms 42 includes a link 44 and an arm 45.

The link 44 is rotatable about the fulcrum shaft 46 relative to the vehicle body frame 2. The arm 45 is rotatable about the joint shaft 47 relative to the link 44. The working device 4 further includes a plurality of arm cylinders 48 and at least one equipment cylinder 49. Each of the plurality of arm cylinders 48 is rotatably connected to the vehicle body frame 2 and the arm 45, and moves the link 44 and the arm 45 to raise and lower the bucket 41. At least one equipment cylinder 49 is configured to tilt the bucket 41. The cabin 5 is attached to the front part of the vehicle body frame 2. A work vehicle 1 has a windowpane 51 provided in a window 5w in front of a cabin 5, and a driver's seat 52 and an operation device (not shown) in the cabin 5. A window 5w is a front window of the cabin 5. The cabin 5 is defined by a cabin frame 7. The window 5w is an opening defined by the cabin frame 7. As shown in FIG. 2, the cabin frame 7 is rotatable about rotation axes RSL and RSR on the vehicle body frame 2. In FIGS. 1 and 2, a common rotation axis $A_{XC}$ defined by rotation axes RSL and RSR is illustrated.

In the embodiment according to the present application, the front-rear direction $D_{FB}$ (forward $D_F$/backward $D_B$) means the front-rear direction (forward/backward) as viewed from an operator sitting on the driver's seat 52 of the cabin 5. The left direction $D_L$, the right direction $D_R$, and the width direction $D_W$ mean the left direction, the right direction, and the left and right direction, respectively, as viewed from the operator. The upward direction $D_U$, the downward direction $D_D$, and the height direction $D_H$ mean the upward direction, the downward direction, and the height direction when viewed from the operator. The front-back/right-left (width)/up-down (height) directions of the work vehicle 1 correspond to the front-back/left-right (width)/up-down (height) directions viewed from the operator.

FIG. 1 shows the left side of the work vehicle 1. As shown in FIG. 2, the vehicle body frame 2 is generally symmetrical with respect to the vehicle body center plane M, and of the pair of arm mechanisms 42, the arm mechanism 42 provided on the left side with respect to the vehicle body center plane M is shown as a first arm mechanism 42L, and the arm mechanism 42 provided on the right side with respect to the vehicle body center plane M is shown as a second arm mechanism 42R. A link 44 provided on the left side of the vehicle body center plane M is shown as a first link 44L. An arm 45 provided on the left side with respect to the vehicle body center plane M is shown as a first arm 45L, and an arm 45 provided on the right side with respect to the vehicle body center plane M is shown as a second arm 45R. A fulcrum shaft 46 provided on the left side with respect to the vehicle body center plane M is shown as a first fulcrum shaft 46L, and a fulcrum shaft 46 provided on the right side with respect to the vehicle body center plane M is shown as a second fulcrum shaft 46R. A joint shaft 47 provided on the left side with respect to the vehicle body center plane M is shown as a first joint shaft 47L, and a joint shaft 47 provided on the right side with respect to the vehicle body center plane M is shown as a second joint shaft 47R.

Referring to FIGS. 1 and 2, the work vehicle 1 further includes an engine 6 provided at the rear of the vehicle body frame 2. The engine 6 is configured to provide driving force to the traveling device 3 and the working device 4. The engine 6 is provided between the pair of arm mechanisms 42 in the width direction $D_W$ of the work vehicle 1. The work vehicle 1 further includes a cover 8 for covering the engine 6. The work vehicle 1 further includes a bonnet cover 9 provided at the rear end of the vehicle body frame 2. The bonnet cover 9 can be opened and closed, and a maintenance worker can perform maintenance work of the engine 6 or the like.

Figure 3:
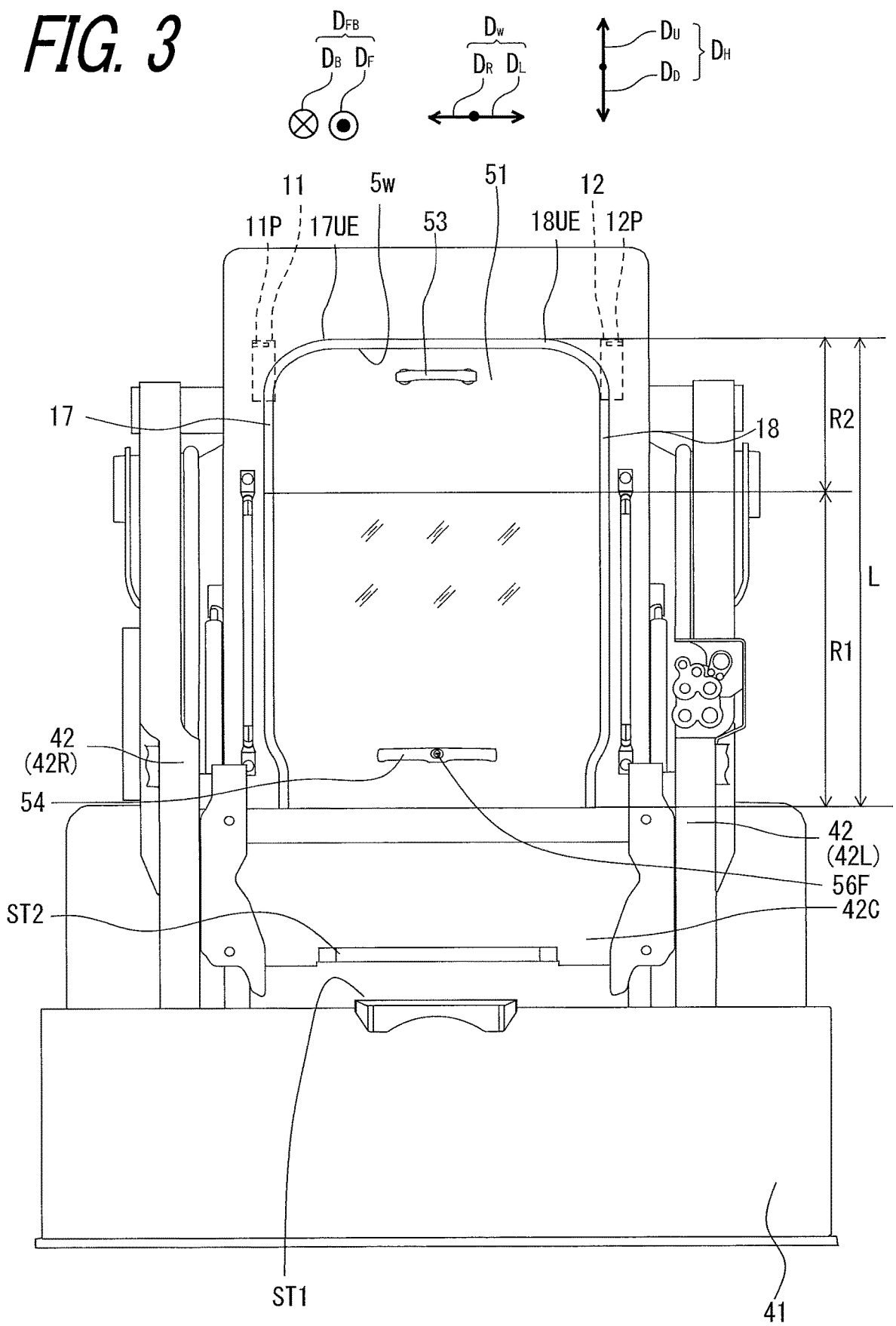
FIG. 3 is a front view of the cabin.
Figure 4:
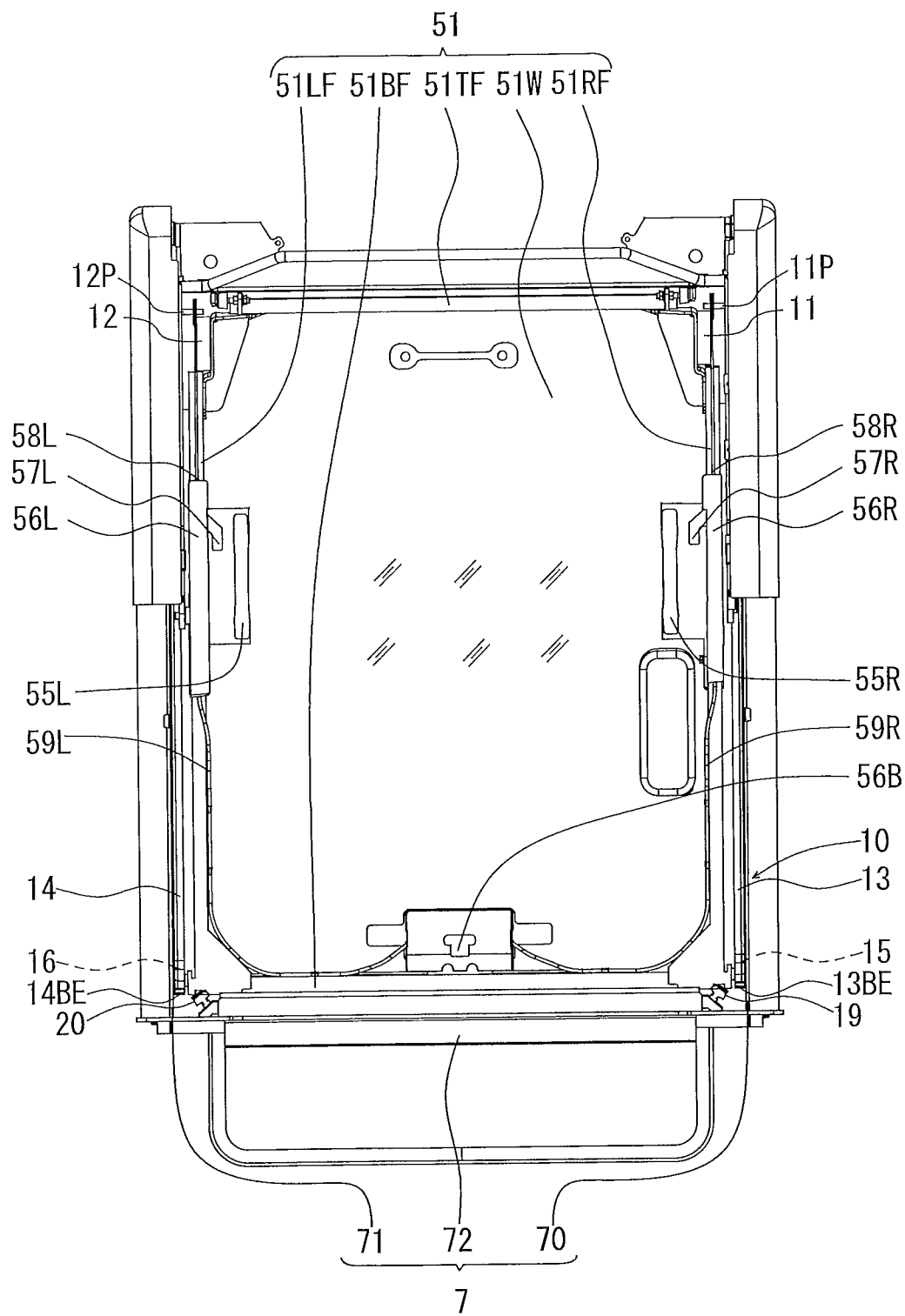
FIG. 4 is a view of the cabin as seen from the inside of the cabin when the cabin window is closed.

FIG. 3 is a view of the cabin 5 as viewed from the front $D_F$. Referring to FIGS. 1 to 3, the work vehicle 1 includes steps ST1 and ST2, respectively, on a bucket 41 and a connecting frame 42C connecting a pair of arm mechanisms 42. The driver gets on the steps ST1 and ST2, holds the handles 53 and 54 provided on the windowpane 51, slides the windowpane 51 upward to open the window 5w, and gets in the cabin 5. FIG. 4 is a view of the windowpane 51 of the cabin 5 viewed from the interior of the cabin 5 forward $D_F$ when the window 5w is closed. In FIG. 4, the cabin frame 7 around the windowpane 51, which is not directly visible from the interior of the cabin 5, is also displayed.

The cabin frame 7 includes a first cabin frame 70, a second cabin frame 71, and a third cabin frame 72. The first cabin frame 70 and the second cabin frame 71 extend in the height direction $D_H$ along the height of the work vehicle 1. The first cabin frame 70 is configured on one side (right side $D_R$) of a window 5w of the cabin 5 of the work vehicle 1. The second cabin frame 71 is configured to face the first cabin frame 70 on the other side (left side $D_L$) opposite to the one side of the window 5w. The second cabin frame 71 faces the first cabin frame 70 in the width direction $D_W$. The first cabin frame 70 includes an exterior frame covering the right side of the cabin 5. The second cabin frame 71 includes an exterior frame covering the left side of the cabin 5.

The windowpane 51 includes a transparent member 51W such as glass, and window frames 51TF, 51BF, 51LF, 51RF for supporting the transparent member 51W in the rear $D_B$ of the transparent member 51W. The window frame 51TF supports the upper end of the transparent member 51W. The window frame 51BF supports the lower end of the transparent member 51W. The window frame 51LF supports the left end of the transparent member 51W. The window frame 51RF supports the right end of the transparent member 51W. The windowpane 51 has a plurality of handles 55L, 55R connected to the window frames 51LF, 51RF, respectively. The plurality of handles 55L, 55R are positioned between the handles 53 and 54 in the height direction $D_H$ when the window 5w is closed.

Figure 5:
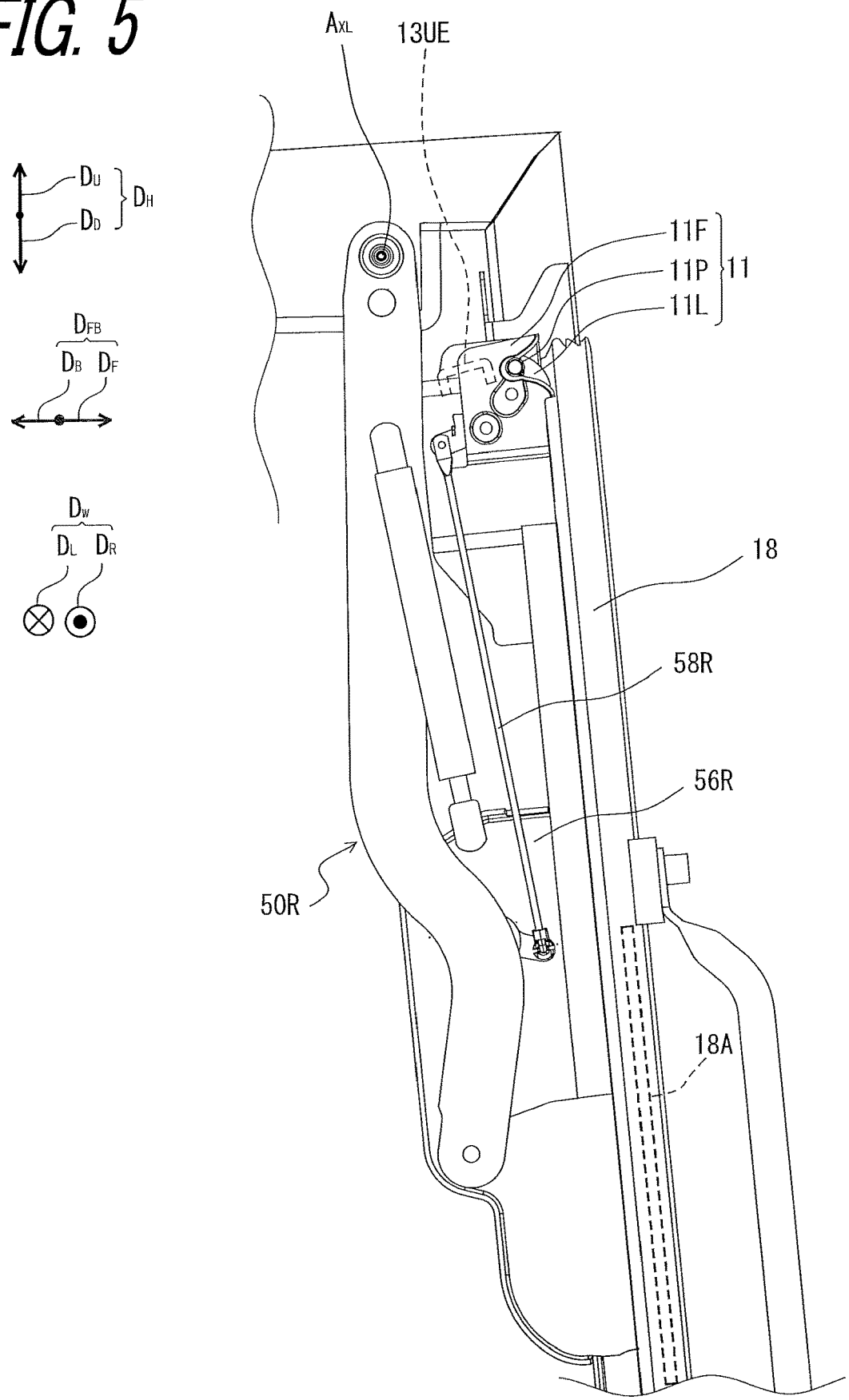
FIG. 5 is an enlarged view of the vicinity of the lock mechanism when the window is closed.

A lock mechanism 11 and an additional lock mechanism 12 for restricting the movement of the windowpane 51 when the window 5w is closed are provided near the upper end of the window 5w. The lock mechanism 11 is provided on the first cabin frame 70 and the windowpane 51. The additional lock mechanism 12 is provided in the second cabin frame 71 and the windowpane 51. FIG. 5 is an enlarged view of the vicinity of the lock mechanism 11 when the window 5w is closed. The lock mechanism 11 has a hook 11F configured to be hooked to a pin 11P fixed to the first cabin frame 70. When the window 5w is closed, the pin 11P is hooked on the hook 11F, and the lock mechanism 11 locks the hook 11F by hooking the latch 11L to restrict the movement of the windowpane 51. That is, the lock mechanism 11 is configured to lock the windowpane 51 with respect to the first cabin frame 70 when the window 5w is closed. Referring to FIGS. 4 and 5, an operation mechanism 56R for releasing the lock mechanism 11 is provided downward $D_D$ of the lock mechanism 11 and adjacent to the right of the handle 55R. The operation mechanism 56R has an operation lever 57R and an operation rod 58R, and when the operation lever 57R is rotated by a driver, the operation rod 58R is operated to release the latch of the lock mechanism 11. Thus, the lock mechanism 11 is unlocked.

Figure 6:
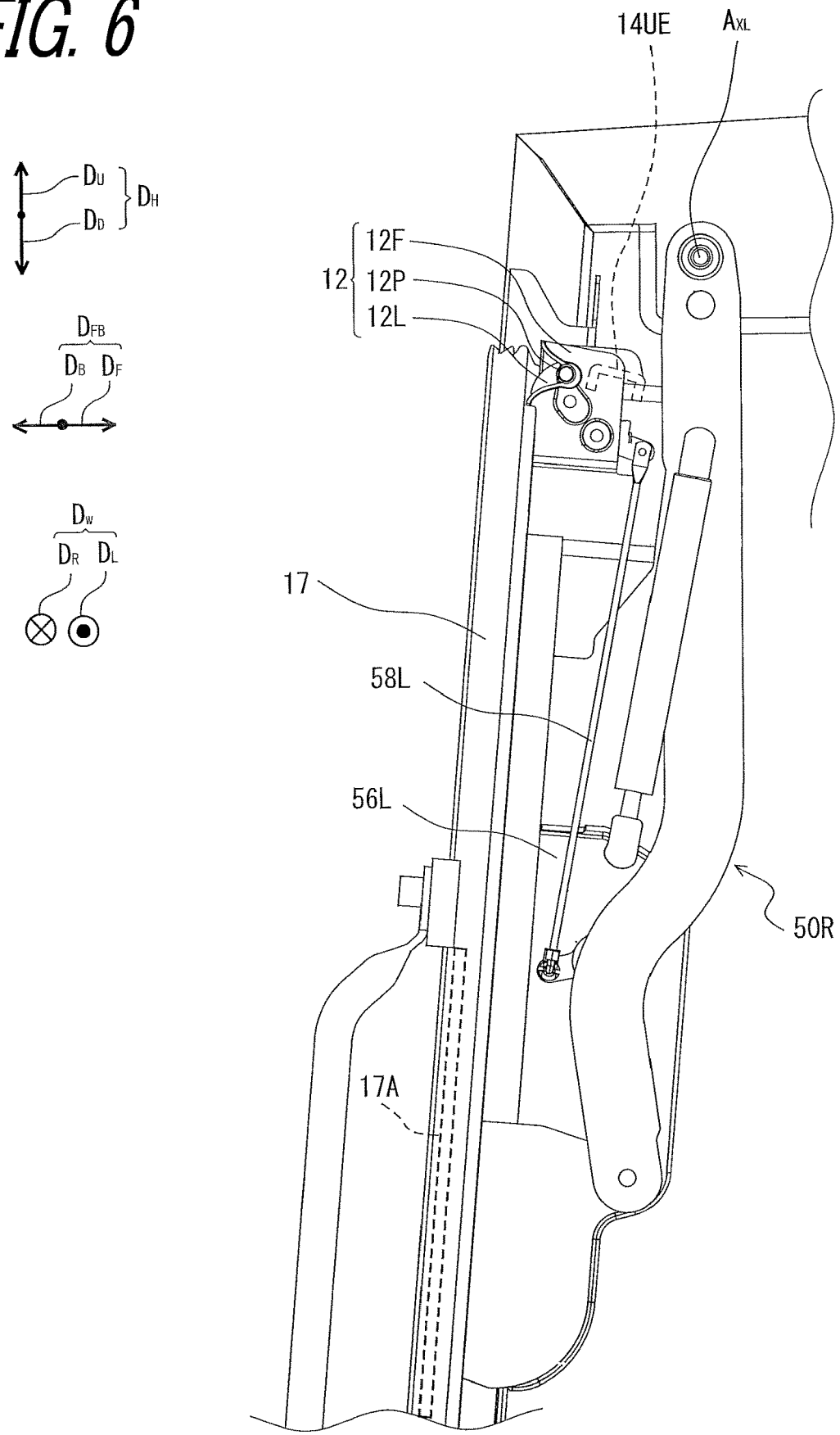
FIG. 6 is an enlarged view of the vicinity of the additional lock mechanism when the window is closed.

FIG. 6 is an enlarged view of the vicinity of the additional lock mechanism 12 when the window 5w is closed. The additional lock mechanism 12 has a hook 12F configured to be hooked to a pin 12P fixed to the second cabin frame 71. When the window 5w is closed, the pin 12P is hooked on the hook 12F, and the additional lock mechanism 12 locks the hook 12F by hooking the latch 12L to restrict the movement of the windowpane 51. That is, the additional lock mechanism 12 is configured to lock the windowpane 51 with respect to the second cabin frame 71 when the window 5w is closed. Referring to FIGS. 4 and 6, an operation mechanism 56L for releasing the lock of the additional lock mechanism 12 is provided downward $D_D$ of the additional lock mechanism 12 and adjacent to the left of the handle 55L. The operation mechanism 56L has an operation lever 57L and an operation rod 58L, and when the operation lever 57L is rotated by a driver, the operation rod 58L is operated to release the latch of the additional lock mechanism 12. Thus, the additional lock mechanism 12 is unlocked. Referring to FIG. 4, the back side of the handle 54 is further provided with an operation mechanism 56B for operating the operation mechanisms 56R, 56L via the operation cables 59R, 59L. Referring to FIG. 3, the handle 54 is further provided with an operation mechanism 56F for operating the operation mechanisms 56R, 56L from the outside via the operation cables 59R, 59L.

Figure 7:
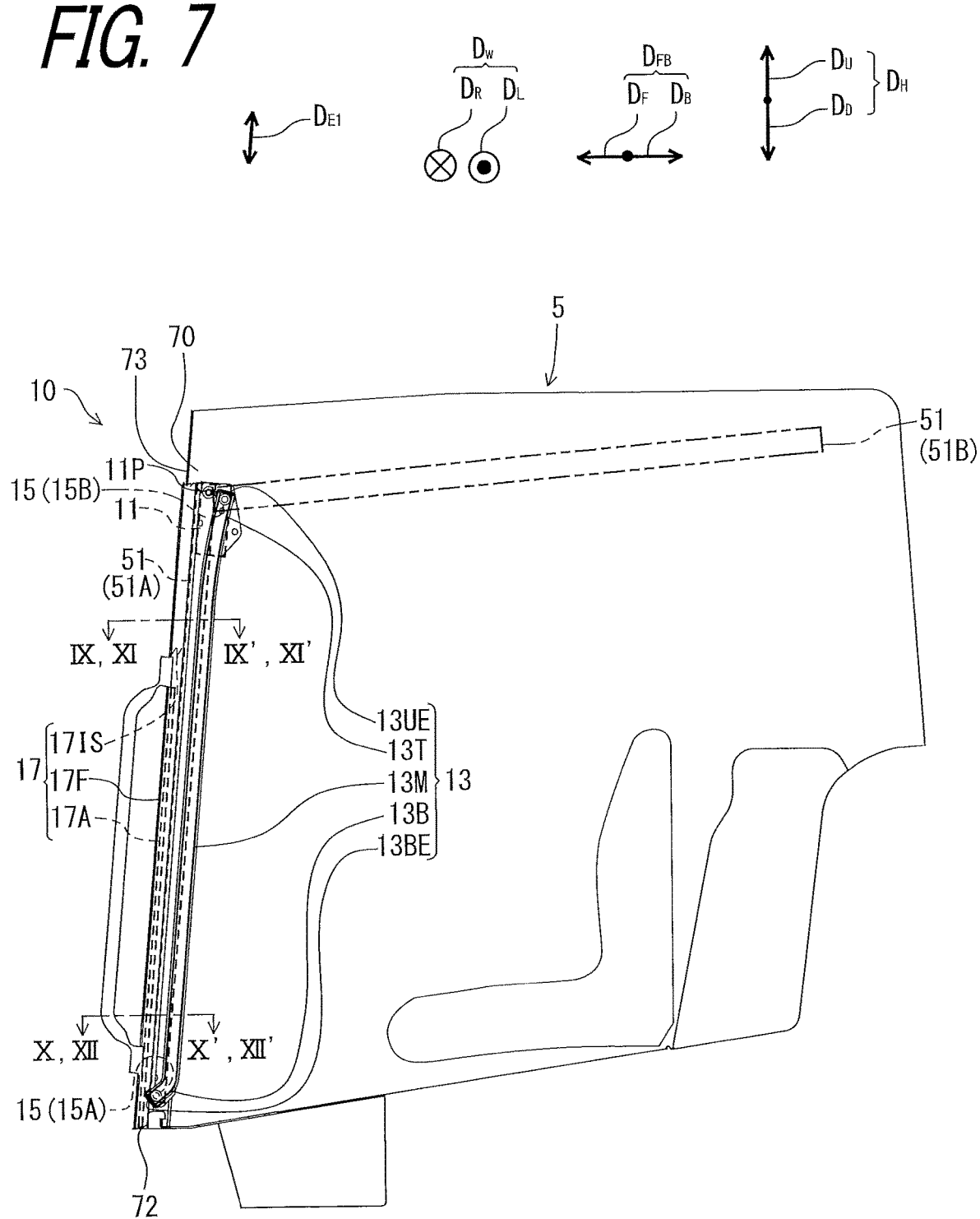
FIG. 7 shows the right side frame of the cabin.
Figure 8:
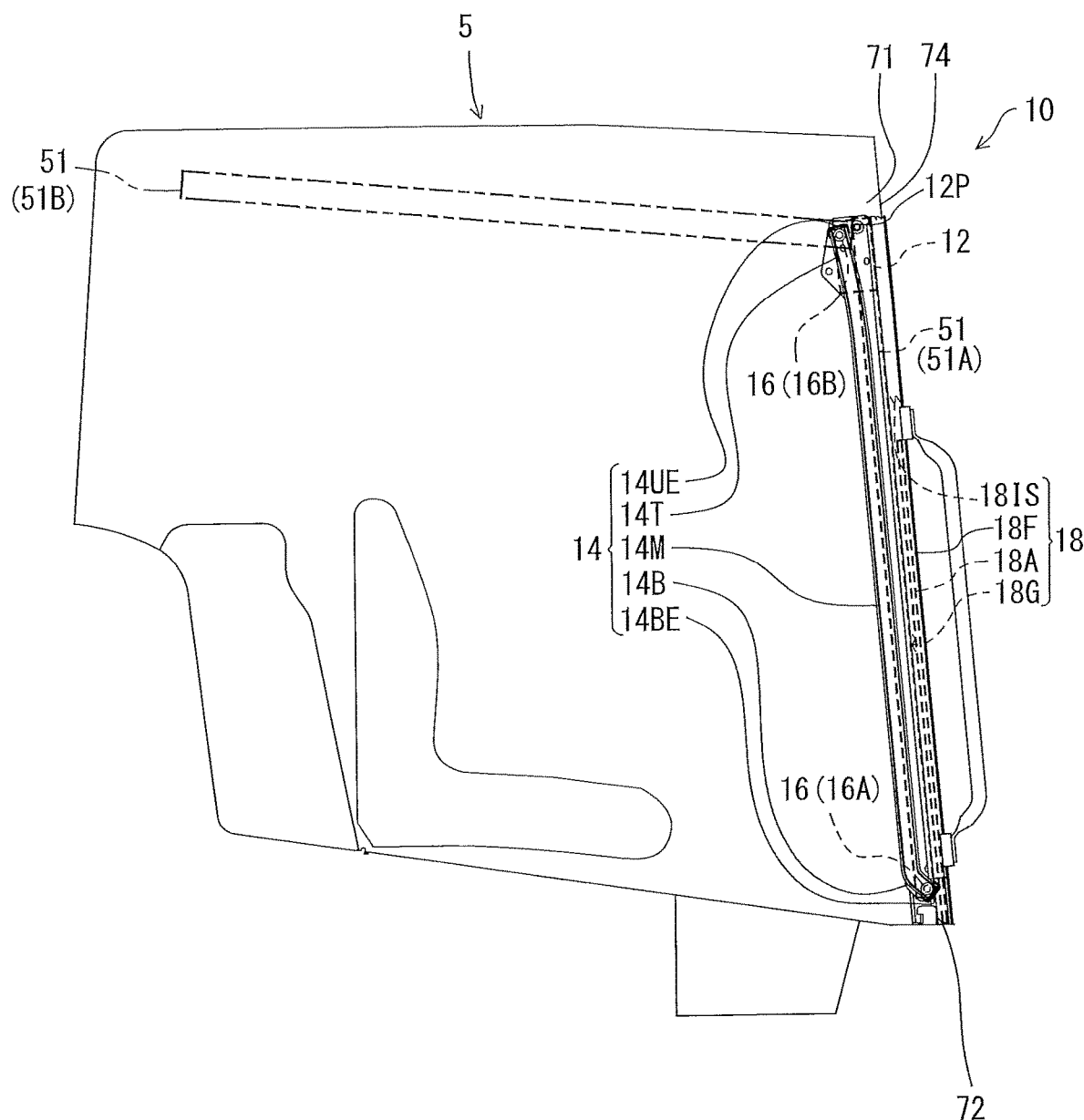
FIG. 8 shows the left side frame of the cabin.

Referring to FIGS. 5 and 6, window links 56R and 56L are connected to operation mechanisms 50R and 50L, respectively. The window links 50R, 50L are pivotable about a common pivot axis $A_{XL}$. FIG. 7 shows a frame on the left side of the cabin 5. FIG. 8 shows a frame on the left side of the cabin 5. In FIGS. 7 and 8, the windowpane 51 with which the window 5w is closed is shown in broken lines as a windowpane 51A, and the windowpane 51 with which the window 5w is open is shown in dashed lines as a windowpane 51B. Although windowpane 51 has been described above as sliding upward, as shown in FIGS. 7 and 8, when windowpane 51 is slid upward, the windowpane 51 is slid like windowpane 51B by being slid upward and backward by window links 50L and 50R. The lock mechanism 11, the additional lock mechanism 12, the operation mechanisms 56R, 56L, 56F, 56B, and the window links 50R, 50L, and the mechanisms connected thereto, which are described above, are disclosed in Japanese Patent No. 5275281 and U.S. Pat. No. 8,303,026, the entire disclosure of which can be incorporated herein by reference.

Still referring to FIG. 7, although it has been described above that the first cabin frame 70 extends in the height direction $D_H$ of the work vehicle 1, more specifically, the first cabin frame 70 extends slightly inclined from the height direction $D_H$ to the rear $D_B$. In the following description, the extending direction of the first cabin frame 70 is referred to as a first extending direction $D_{E1}$. Still referring to FIG. 8, although it has been described above that the second cabin frame 71 extends in the height direction $D_H$ of the work vehicle 1, more specifically, the second cabin frame 71 extends slightly inclined from the height direction $D_H$ to the rear $D_B$. The second cabin frame 71 extends in the first extending direction $D_{E1}$.

A work vehicle 1 is provided with a window stabilization mechanism 10 for stabilizing a windowpane 51 (preventing the windowpane 51 from rattling) when the window 5w is closed. Referring to FIGS. 4 and 7, the window stabilization mechanism 10 includes the lock mechanism 11, which is described above, a rail 13, a sliding member 15, and a seal mechanism 17. The rail 13 is mounted on the first cabin frame 70. The rail 13 extends in the height direction $D_H$ along the height of the work vehicle 1. More specifically, the rail 13 includes a rail upper part 13T, a rail middle part 13M, and a rail lower part 13B. The rail middle part 13M extends in a first extending direction $D_{E1}$. The rail upper part 13T is connected to the rail middle part 13M and extends in a direction inclined from the first extending direction $D_{E1}$ to the rear $D_B$. The rail lower part 13B is connected to the rail middle part 13M and extends in a direction inclined forward $D_F$ from the first extending direction $D_{E1}$.

Referring to FIG. 7, the lock mechanism 11 is located near the upper end 13UE of the rail 13 in the height direction $D_H$ when the window 5w is closed. Since the upper end 13UE of the rail 13 is located at one end in the length direction of the rail 13, the upper end 13UE may be referred to as a first end. The lower end 13BE of the rail 13 may also be referred to as a second end because it is located at a second end opposite the first end in the lengthwise direction of the rail 13. FIG. 5 illustrates the upper end 13UE of the rail 13 with a broken line. Referring to FIG. 5, the lock mechanism 11 overlaps the upper end 13UE of the rail 13 when viewed from the horizontal direction perpendicular to the height direction $D_H$. More specifically, the lock mechanism 11 overlaps the upper end 13UE of the rail 13 when viewed from the width direction $D_W$.

The sliding member 15 is provided on the windowpane 51, and is configured to slide on the rail 13 to guide the windowpane 51 in accordance with opening and closing of the window 5w. In FIGS. 4 and 7, the sliding member 15 is illustrated as a roller, but is not limited thereto. The sliding member 15 may be a rotatable rectangular sliding member. In FIG. 7, a sliding member 15 corresponding to the window 51A that is closed is illustrated as a sliding member 15A. A sliding member 15 corresponding to the windowpane 51B is shown as a sliding member 15B. As shown in FIG. 7, the sliding member 15 is located at an upper end (first end) 13UE of the rail 13 when the window 5w is opened and at a lower end (second end) 13BE of the rail 13 when the window 5w is closed.

A seal mechanism 17 is provided along the rail 13 to seal the gap between the first cabin frame 70 and the windowpane 51 when the window 5w is closed. More specifically, the seal mechanism 17 is attached to the first cabin frame 70 and extends in the first extending direction $D_{E1}$. Since the rail lower part 13B extends in a direction inclined forward $D_F$ from the first extending direction $D_{E1}$, the sliding member 15 approaches the seal mechanism 17 when the window 5w is closed, and the windowpane 51 is brought into close contact with the seal mechanism 17. Thus, the gap between the first cabin frame 70 and the windowpane 51 is sealed.

Referring to FIGS. 4 and 8, the window stabilization mechanism 10 further includes the aforementioned additional lock mechanism 12, additional rails 14, additional sliding members 16, and additional seal mechanism 18. The additional rail 14 is mounted on the second cabin frame 71. The additional rail 14 extends in the height direction $D_H$ along the height of the work vehicle 1. More specifically, the additional rail 14 includes an additional rail upper part 14T, an additional rail middle part 14M, and an additional rail lower part 14B. The additional rail middle part 14M extends in the first extending direction $D_{E1}$. The additional rail upper part 14T is connected to the additional rail middle part 14M and extends in a direction inclined from the first extending direction $D_{E1}$ to the rear $D_B$. The additional rail lower part 14B is connected to the additional rail middle part 14M and extends in a direction inclined forward $D_F$ from the first extending direction $D_{E1}$.

Referring to FIG. 8, the additional lock mechanism 12 is located near an upper end 14UE of the height direction $D_H$ of the additional rail 14 when the window 5w is closed. Since the upper end 14UE of the additional rail 14 is located at one end in the lengthwise direction of the additional rail 14, the upper end 14UE may be referred to as a third end. The lower end 14BE of the additional rail 14 may also be referred to as a fourth end because it is located at the fourth end opposite the third end in the lengthwise direction of the additional rail 14. FIG. 6 illustrates the upper end 14UE of the additional rail 14 with a broken line. Referring to FIG. 6, the additional lock mechanism 12 overlaps the upper end 14UE of the additional rail 14 when viewed in a horizontal direction perpendicular to the height direction $D_H$. More specifically, the additional lock mechanism 12 overlaps the upper end 14UE of the additional rail 14 when viewed from the width direction $D_W$.

The additional sliding member 16 is provided on the windowpane 51 and is configured to slide on the additional rail 14 to guide the windowpane 51 in accordance with opening and closing of the window 5w. In FIGS. 4 and 8, the additional sliding member 16 is illustrated with, but is not limited to, rollers. The additional sliding member 16 may be a rotatable rectangular sliding member. In FIG. 8, an additional sliding member 16 corresponding to the windowpane 51A is illustrated as an additional sliding member 16A. An additional sliding member 16 corresponding to the windowpane 51B is shown as a sliding member 16B. As shown in FIG. 8, the additional sliding member 16 is located at an upper end (third end) 14UE of the additional rail 14 when the window 5w is opened and at a lower end (fourth end) 14BE of the additional rail 14 when the window 5w is closed.

The additional seal mechanism 18 is provided along the additional rail 14 to seal the gap between the second cabin frame 71 and the windowpane 51 when the window 5w is closed. More specifically, the additional seal mechanism 18 is attached to the second cabin frame 71 and extends in the first extending direction $D_{E1}$. Since the additional rail lower part 14B extends in a direction inclined forward $D_F$ from the first extending direction $D_{E1}$, the additional sliding member 16 approaches the additional seal mechanism 18 when the window 5w is closed, and the windowpane 51 is brought into close contact with the additional seal mechanism 18. Thus, the gap between the second cabin frame 71 and the windowpane 51 is sealed.

Figure 9:
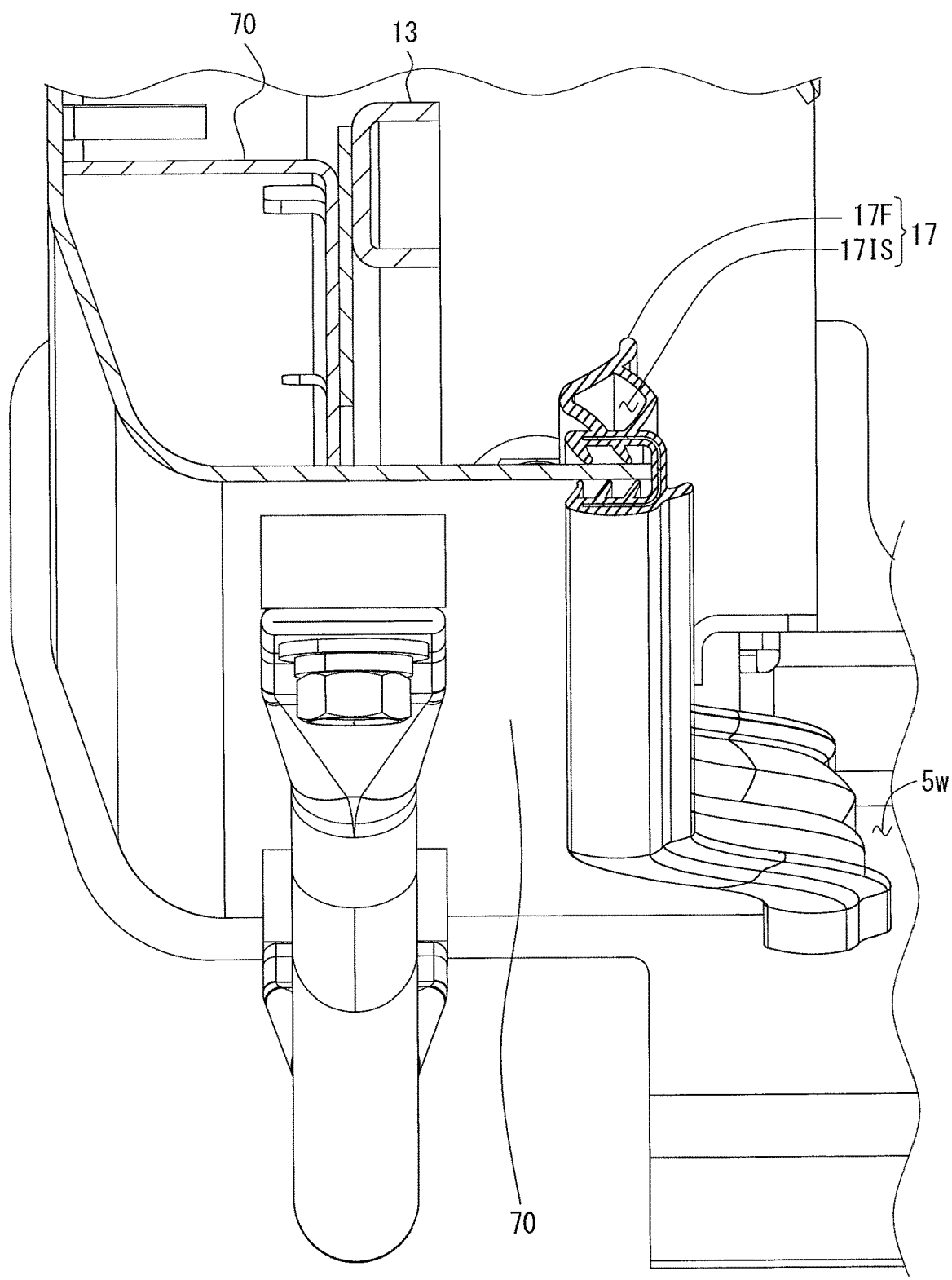
FIG. 9 is a sectional view taken along the section line IX-IX' of FIG. 7 when the window is opened.
Figure 10:
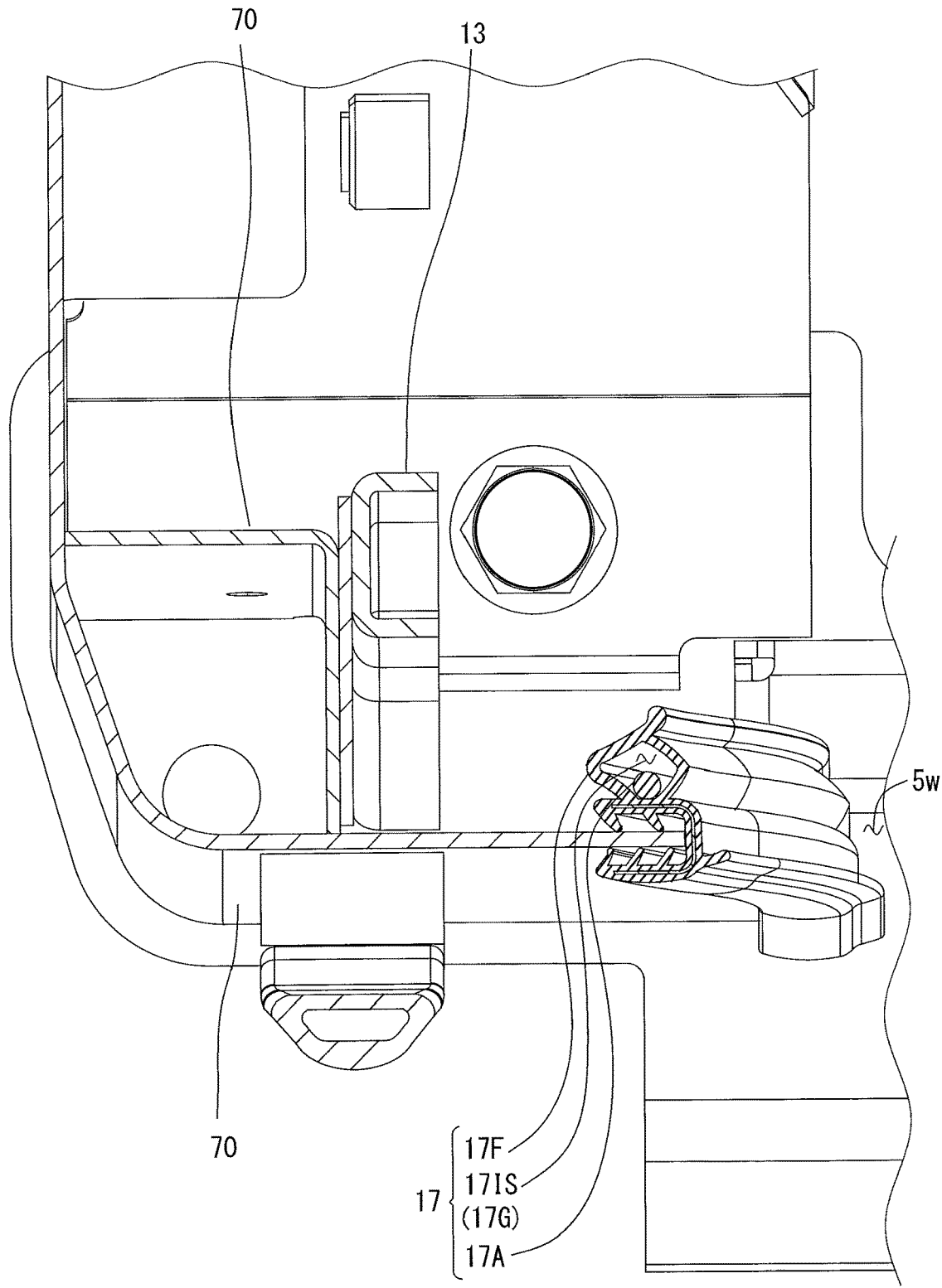
FIG. 10 is a cross-sectional view taken along the section line X-X' of FIG. 7 when the window is opened.

FIG. 9 is a sectional view taken along the line IX-IX' in FIG. 7 when the window 5w is opened (when windowpane 51 is at the position of the windowpane 51B). FIG. 10 is a cross-sectional view taken along the line X-X' of FIG. 7 when the window 5w is open (when windowpane 51 is at the position of the windowpane 51B). Referring to FIGS. 7 and 9, the seal mechanism 17 includes a seal frame body 17F, which is an elastic body and has an internal space 17IS. Referring to FIGS. 7 and 10, the seal mechanism 17 includes a first additional elastic body 17A provided in the internal space 17IS. An internal space 17IS provided with a first additional elastic body 17A has a gap 17G. The first additional elastic body 17A is, for example, urethane rubber. The elastic body of the seal frame body 17F may be the same as or different from the elastic body of the first additional elastic body 17A. However, since the first additional elastic body 17A is provided in the internal space 17IS, in order to deform the seal frame body 17F including the first additional elastic body 17A in the front-rear direction $D_{FB}$, a larger force is required than to reform the seal frame body 17F not including the first additional elastic body 17A. Therefore, it can be said that the elastic modulus of the seal frame body 17F in the front-rear direction $D_{FB}$ of the work vehicle 1 is smaller than that of the seal frame body 17F including the first additional elastic body 17A in the front-rear direction $D_{FB}$.

As shown in FIG. 3, the first additional elastic body 17A is provided in the region R1 away from the position of the lock mechanism 11 when the window 5w is closed. That is, as shown in FIGS. 3 and 7, the first additional elastic body 17A is not provided in the internal space 17IS in the region R2 from the upper end 17UE of the seal frame body 17F in the height direction $D_H$. The ratio of the region R2 to the height L of the seal frame body 17F is 15% or more. Therefore, the first additional elastic body 17A is not provided in the internal space 17IS within 15% of the height L of the seal frame body 17F from the upper end 17UE of the seal frame body 17F in the height direction $D_H$. That is, the first additional elastic body 17A is not provided in a portion of the internal space 17IS of the seal frame body 17F which is positioned in the vicinity of the lock mechanism 11 when the window 5w is closed.

Figure 11:
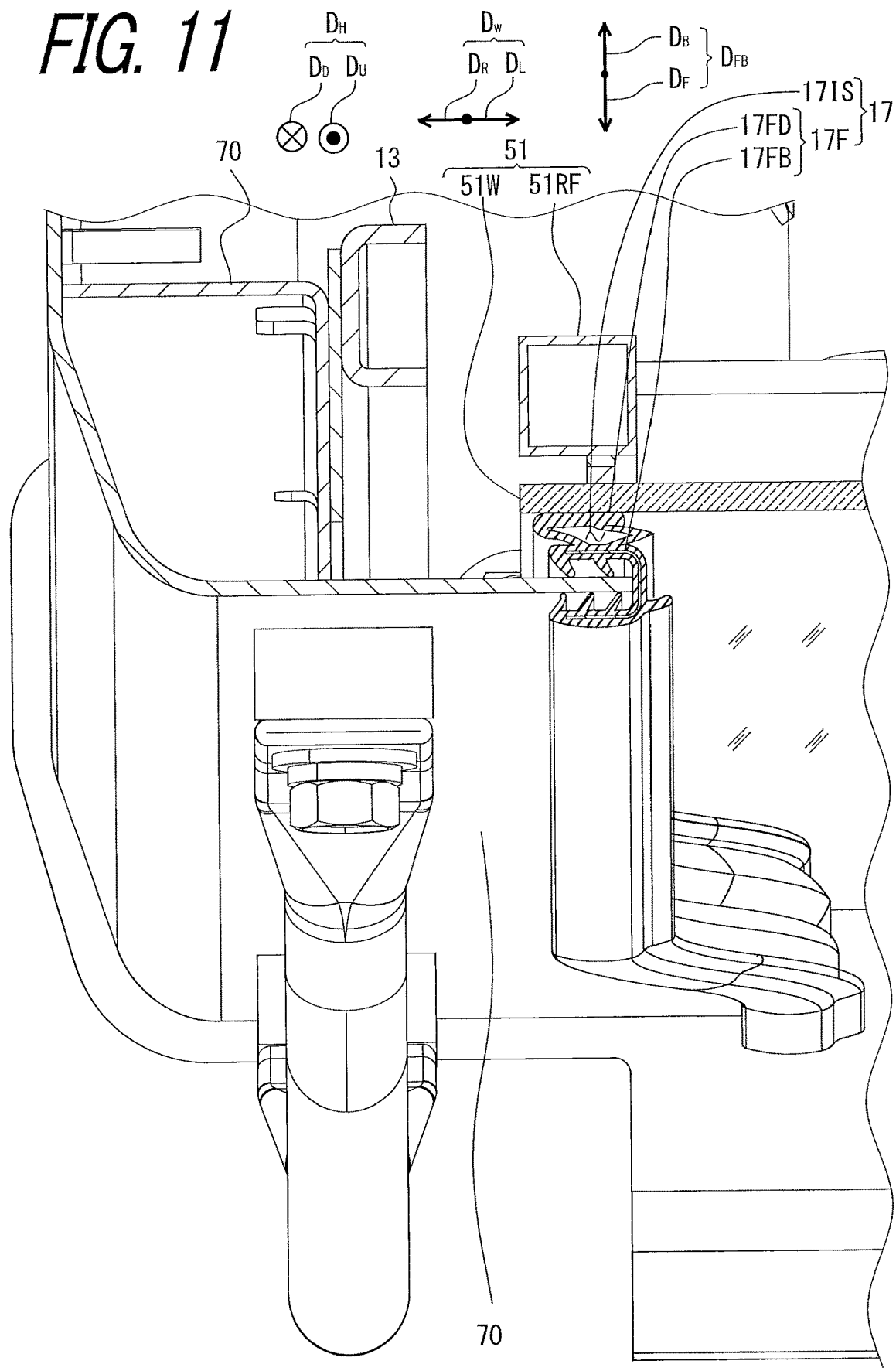
FIG. 11 is a cross-sectional view taken along the section line XI-XI' of FIG. 7 when the window is closed.
Figure 12:
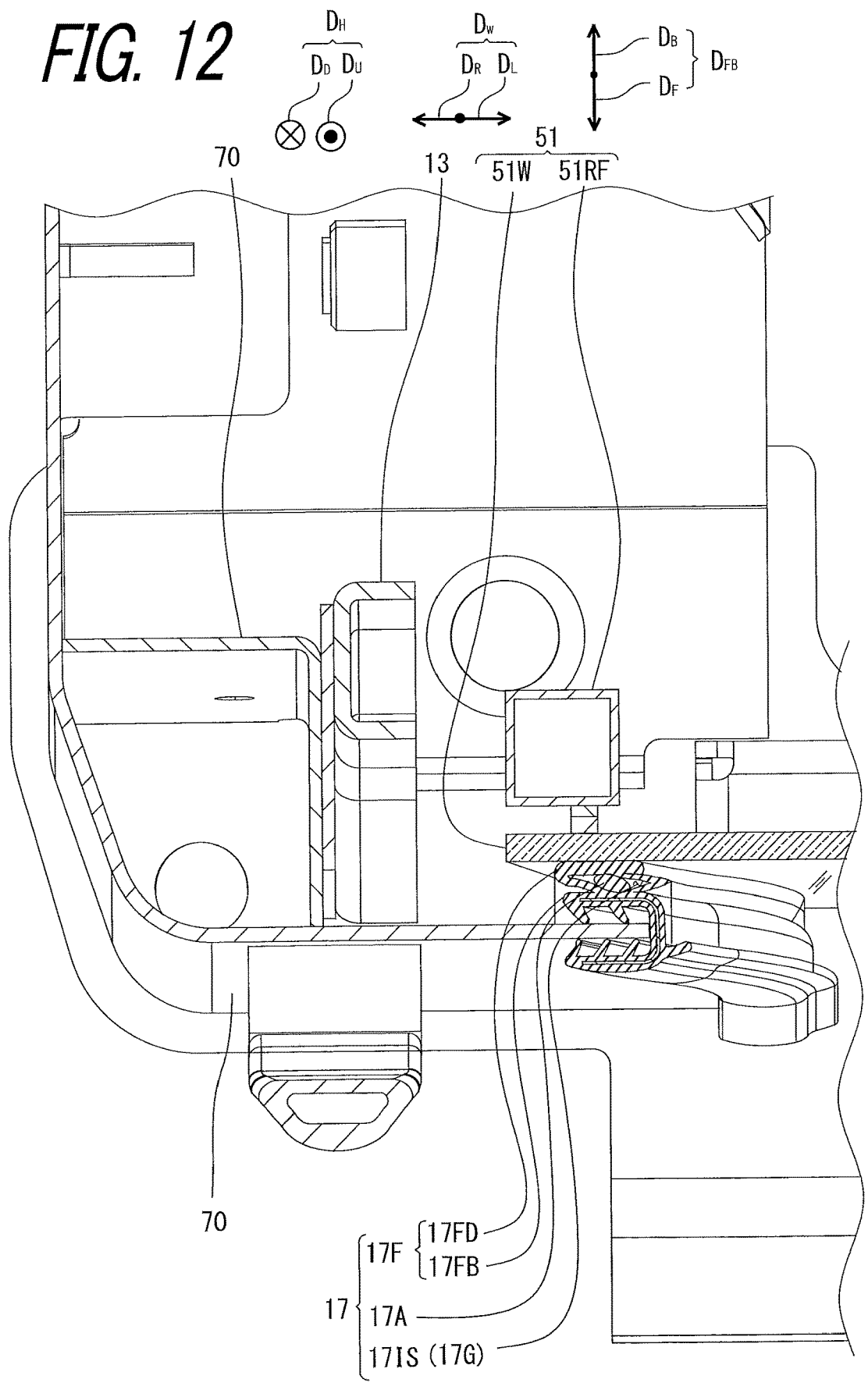
FIG. 12 is a cross-sectional view taken along the section line XII-XII' of FIG. 7 when the window is closed.

FIG. 11 is a cross-sectional view taken along the line XI-XI' of FIG. 7 when window 5w is closed (when the windowpane 51 is at the position of the windowpane 51A). FIG. 12 is a cross-sectional view taken along the line XII-XII' of FIG. 7 when the window 5w is closed (when the windowpane 51 is at the position of the windowpane 51A). Referring to FIGS. 11 and 12, the seal frame body 17F is in close contact with the windowpane 51 at any location. However, with reference to FIG. 11, in a position where the first additional elastic body 17A is not provided in the internal space 17IS, a gap due to the internal space 17IS is provided between the proximal end portion 17FB and the distal end portion 17FD in the front-rear direction $D_{FB}$ of the seal frame body 17F, while with reference to FIG. 12, in a position where the first additional elastic body 17A is provided in the internal space 17IS, the first additional elastic body 17A is sandwiched between the proximal end portion 17FB and the distal end portion 17FD in the front-rear direction $D_{FB}$, and the pressure applied in the front-rear direction $D_{FB}$ by the deformation of the first additional elastic body 17A is applied to the windowpane 51. Therefore, the seal mechanism 17 can suppress the backlash of the windowpane 51 to the front-rear direction $D_{FB}$ in the region R1 separated from the lock mechanism 11. On the other hand, since the seal mechanism 17 does not strongly press the windowpane 51 against the front-rear direction $D_{FB}$ in the region R2 close to the lock mechanism 11, the locking by the lock mechanism 11 becomes smooth when the window 5w is closed.

The additional seal mechanism 18 has the same internal structure as the internal structure of the seal mechanism 17. Therefore, as schematically shown in FIG. 8, the additional seal mechanism 18 includes an additional seal frame body 18F of an elastic body having an additional internal space 18IS. The additional seal mechanism 18 includes a second additional elastic body 18A provided in the additional internal space 18IS. The additional internal space 18IS provided with the second additional elastic body 18A has a gap 18G. The second additional elastic body 18A is, for example, urethane rubber. The elastic body of the additional seal frame body 18F may be the same as or different from the elastic body of the second additional elastic body 18A. However, since the second additional elastic body 18A is provided in the additional internal space 18IS, in order to deform the additional seal frame body 18F including the second additional elastic body 18A in the front-rear direction $D_{FB}$, a larger force is required than to deform the additional seal frame body 18F not including the second additional elastic body 18A. Therefore, it can be said that the elastic modulus of the additional seal frame body 18F in the front-rear direction $D_{FB}$ of the work vehicle 1 is smaller than that of the additional seal frame body 18F including the second additional elastic body 18A in the front-rear direction $D_{FB}$.

The second additional elastic body 18A is provided in the region R1 shown in FIG. 3, which is away from the position of the lock mechanism 11 when the window 5w is closed. That is, the second additional elastic body 18A is not provided in the additional internal space 18IS in the region R2 from the upper end 18UE of the additional seal frame body 18F in the height direction $D_H$. The ratio of the region R2 to the height L of the additional seal frame body 18F is 15% or more. Therefore, the second additional elastic body 18A is not provided in the additional internal space 18IS within a range of 15% of the height L of the additional seal frame body 18F from the upper end 18UE of the additional seal frame body 18F in the height direction $D_H$. That is, the second additional elastic body 18A is not provided in a portion of the additional internal space 18IS of the additional seal frame body 18F which is positioned in the vicinity of the additional lock mechanism 12 when the window 5w is closed.

Since the additional seal mechanism 18 has the same internal structure as the internal structure of the seal mechanism 17, it produces the same effect as the seal mechanism 17 described above. Since the lock mechanism 11, the additional lock mechanism 12, the seal mechanism 17, and the additional seal mechanism 18 restrict the movement of the upper right corner, the upper left corner, the lower right corner, and the lower left corner of the windowpane 51, the rattling of the windowpane 51 is more effectively suppressed by these mechanisms.

Figure 13:
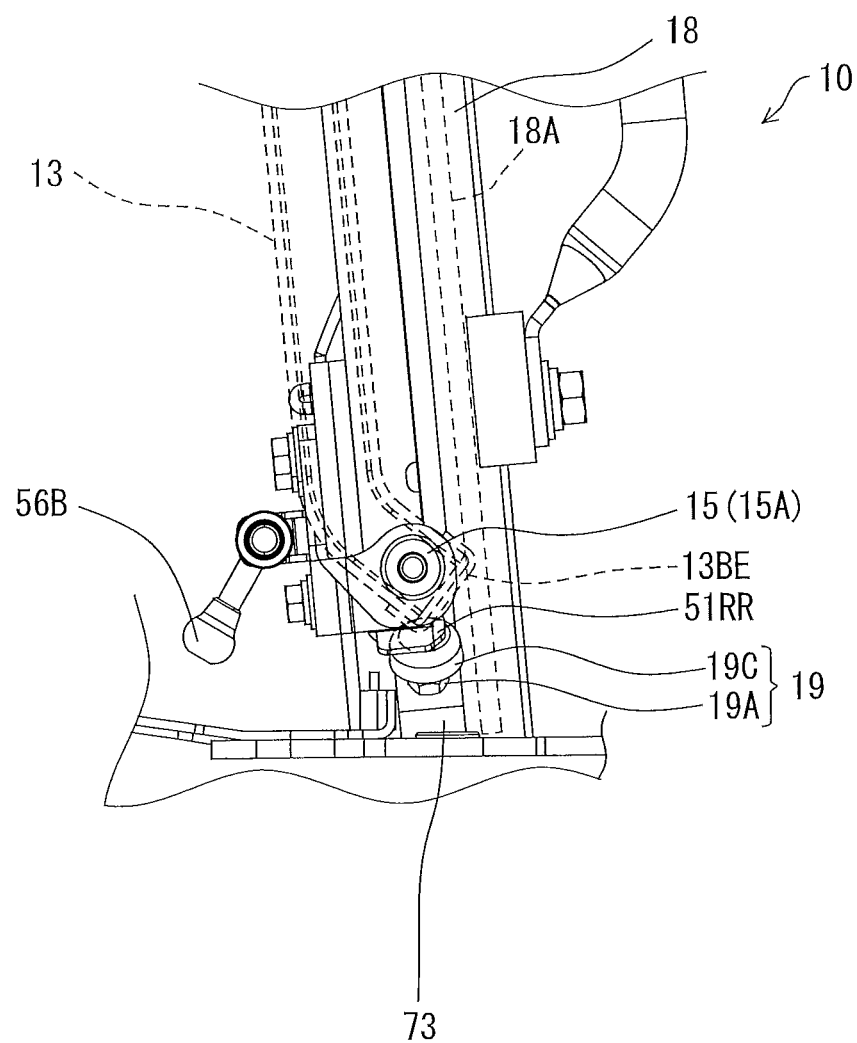
FIG. 13 is an enlarged view of the vicinity of the window support member as seen in the width direction when the window is closed.
Figure 14:
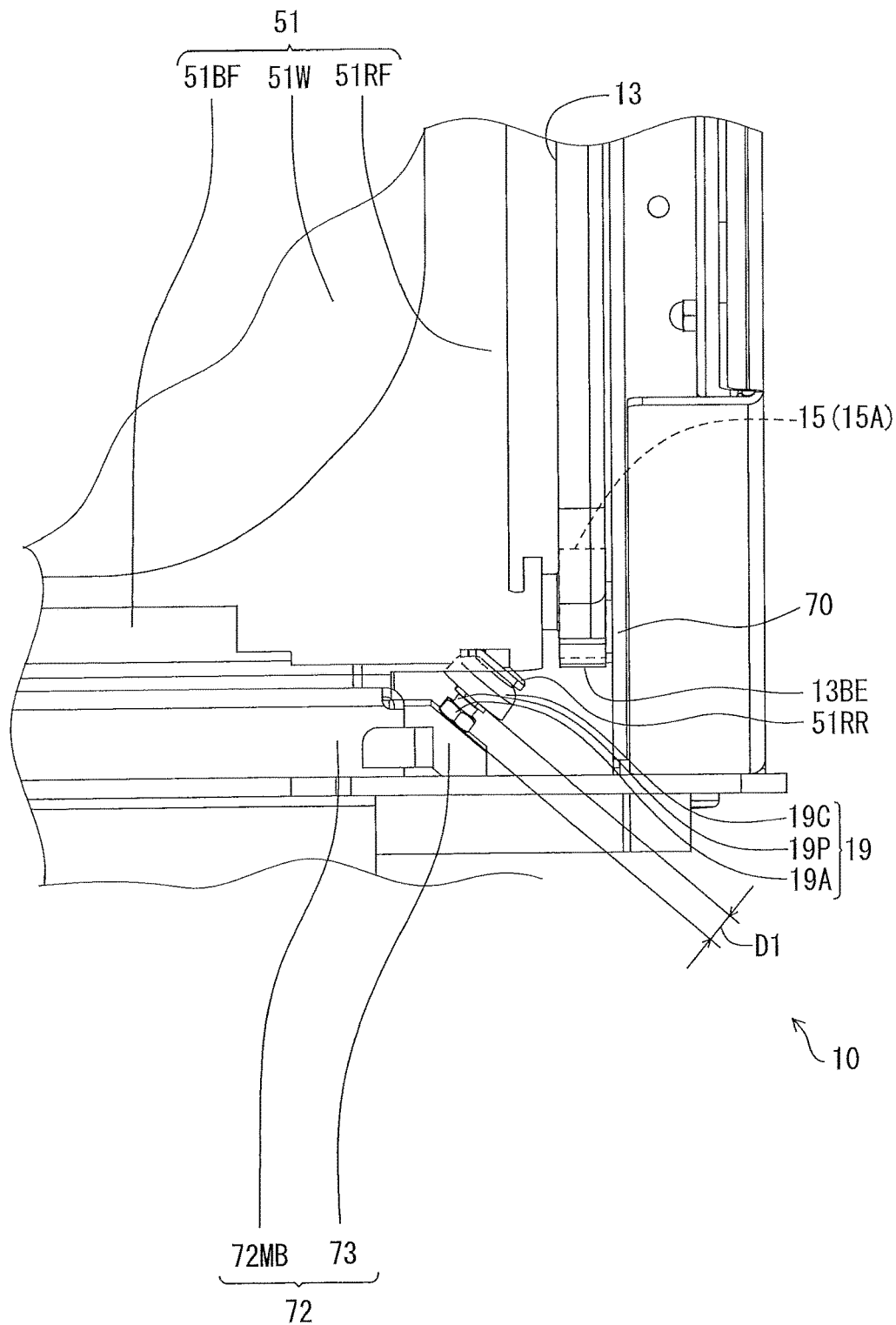
FIG. 14 is an enlarged view of the periphery of the window support member of FIG. 4.

Referring still to FIG. 4, the window stabilization mechanism 10 further includes a window support member 19 and an additional window support member 20. The window support member 19 is provided near the lower end (second end) 13BE of the rail 13. FIG. 13 is an enlarged view of the vicinity of the window support member 19 in the width direction $D_W$ (leftward $D_L$) when the window 5w is closed. FIG. 13 illustrates rail 13 in broken lines. Referring to FIG. 13, the window support member 19 overlaps the lower end (second end) 13BE of the rail 13 when viewed from the horizontal direction perpendicular to the height direction $D_H$. More specifically, the window support member 19 overlaps the lower end (second end) 13BE of the rail 13 when viewed from the width direction $D_W$. FIG. 14 is an enlarged view of the periphery of the window support member 19 of FIG. 4. Referring to FIG. 14, the window support member 19 abuts against the windowpane 51 when the window 5w is closed, and presses the windowpane 51 in an oblique direction $D_{f1}$ from the windowpane 51 toward the rail 13 and from the lower end (second end) 13BE of the rail 13 toward the upper end (first end) 13UE of the rail 13 when the windowpane 51 is locked by the lock mechanism 11. The oblique direction $D_{f1}$ is a right direction $D_R$ and an upward direction $D_U$.

Figure 15:
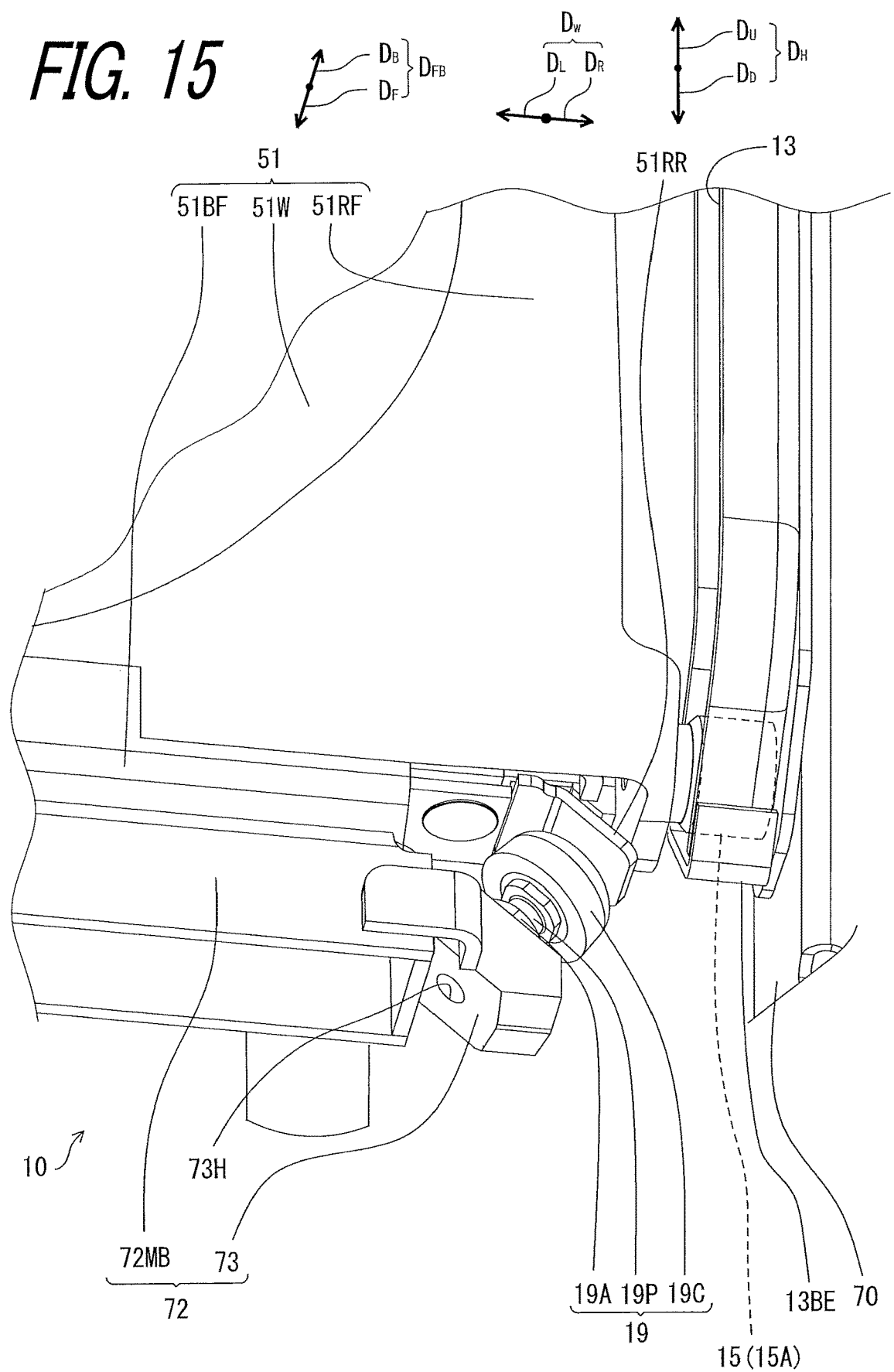
FIG. 15 is an enlarged perspective view of the periphery of the window support member when the window is closed.

FIG. 15 is an enlarged perspective view of the periphery of the window support member 19 when the window 5w is closed. Referring to FIGS. 13 through 15, the window support member 19 includes an abutting member 19C, a pin 19P, and an adjustment member 19A. The abutting member 19C is configured to abut on the windowpane 51. More specifically, the window stabilization mechanism 10 is further provided with a receiving member 51RR provided on the windowpane 51 so as to abut on the abutting member 19C in the oblique direction $D_{f1}$, and the abutting member 19C is configured to abut on the receiving member 51RR. Referring to FIG. 15, the receiving member 51RR is connected to the window frame 51RF.

The pin 19P connects the third cabin frame 72 to the abutting member 19C. More specifically, the third cabin frame 72 includes a third cabin frame body 72MB extending in the width direction $D_W$ and a connecting member 73 tilting rightward $D_R$ and downward $D_D$ from the third cabin frame body 72MB. The pin 19P connects the abutting member 19C and the connecting member 73. The connecting member 73 extends in a direction perpendicular to the oblique direction $D_{f1}$. The adjustment member 19A is connected to the pin 19P. As shown in FIG. 14, the adjustment member 19A is configured to adjust the distance D1 between the abutting member 19C and the third cabin frame 72 in the lengthwise direction of the pin P (oblique direction $D_{f1}$). Specifically, the pin 19P is a rod-like member having screw threads. As shown in FIG. 15, the connecting member 73 has a screw hole 73H, and the pin 19P is screwed into the screw hole 73H. The adjustment member 19A is a nut configured to be screwed with the screw thread. The diameter of the nut is larger than the diameter of the screw hole 73H. The adjustment member 19A can adjust the distance D1 by adjusting the position where it is screwed with the pin 19P.

Figure 16:
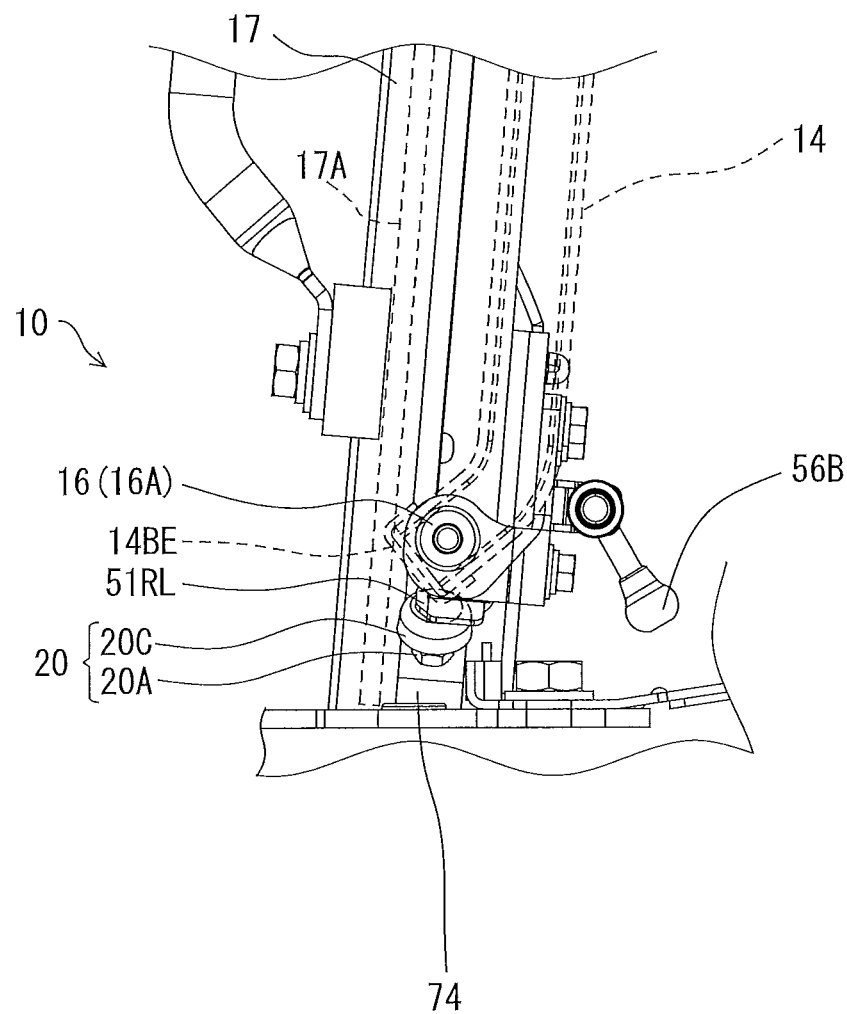
FIG. 16 is an enlarged view of the vicinity of the additional window support member as seen in the width direction when the window is closed.
Figure 17:
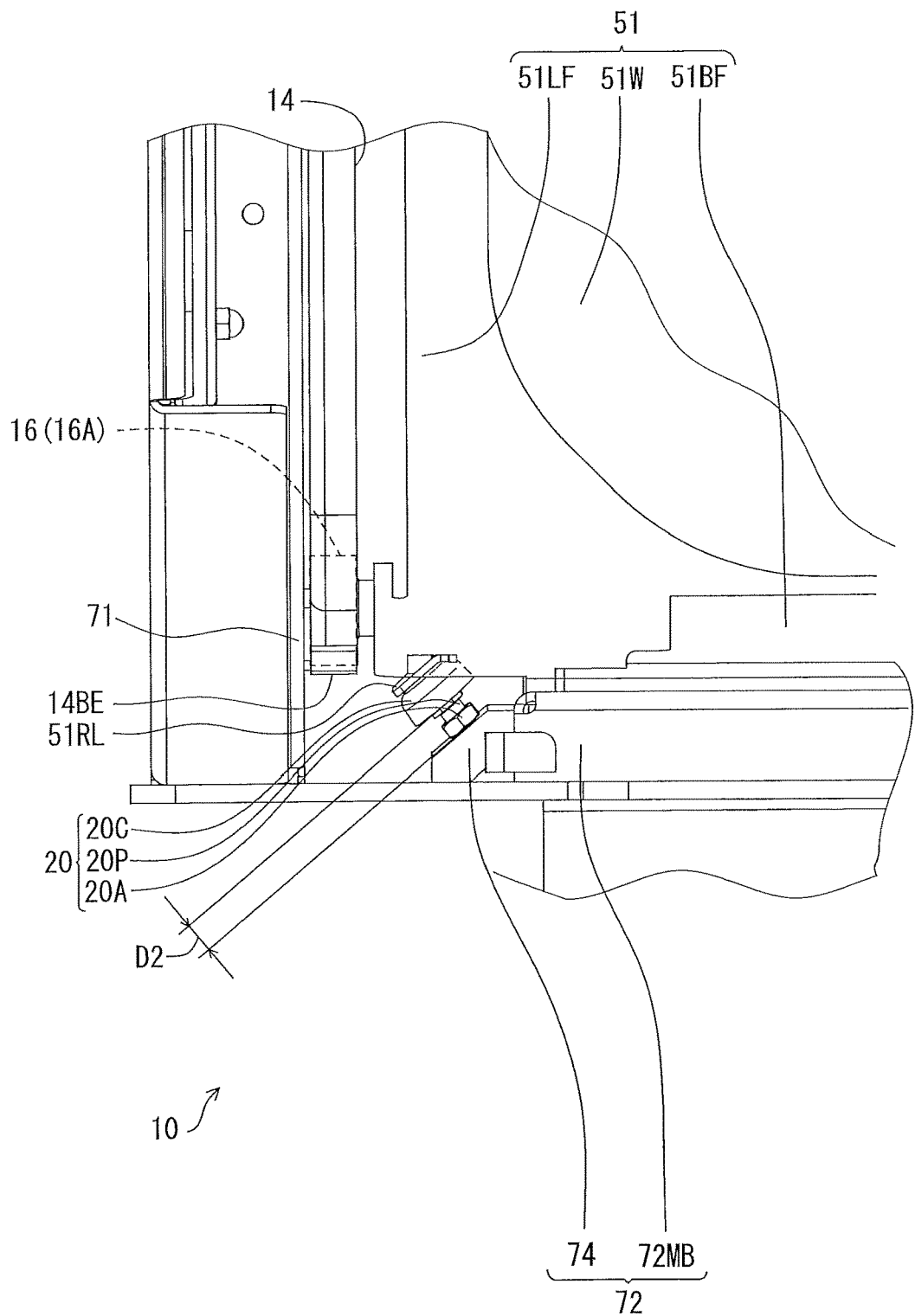
FIG. 17 is an enlarged view of the periphery of the additional window support member of FIG. 4.

The additional window support member 20 is provided near the lower end (fourth end) 14BE of the additional rail 14. FIG. 16 is an enlarged view of the periphery of the additional window support member 20 in the width direction $D_W$ (leftward $D_L$) when the window 5w is closed. FIG. 16 illustrates additional rails 14 in broken lines. Referring to FIG. 16, the additional window support member 20 overlaps the lower end (fourth end) 14BE of the additional rail 14 when viewed from a horizontal direction perpendicular to the height direction $D_H$. More specifically, the additional window support member 20 overlaps the lower end (fourth end) 14BE of the additional rail 14 when viewed from the width direction $D_W$. FIG. 17 is an enlarged view of the vicinity of the additional window support member 20 of FIG. 4. Referring to FIG. 17, the additional window support member 20 abuts the windowpane 51 when the window 5w is closed and presses the windowpane 51 in an additional oblique direction $D_{f2}$ from the windowpane 51 toward the additional rail 14 and from the lower end (fourth end) 14BE of the additional rail 14 toward the upper end (third end) 14UE of the additional rail 14 when the windowpane 51 is locked by the additional lock mechanism 12. The additional oblique direction $D_{f2}$ is a left direction $D_L$ and an upward direction $D_U$.

Figure 18:
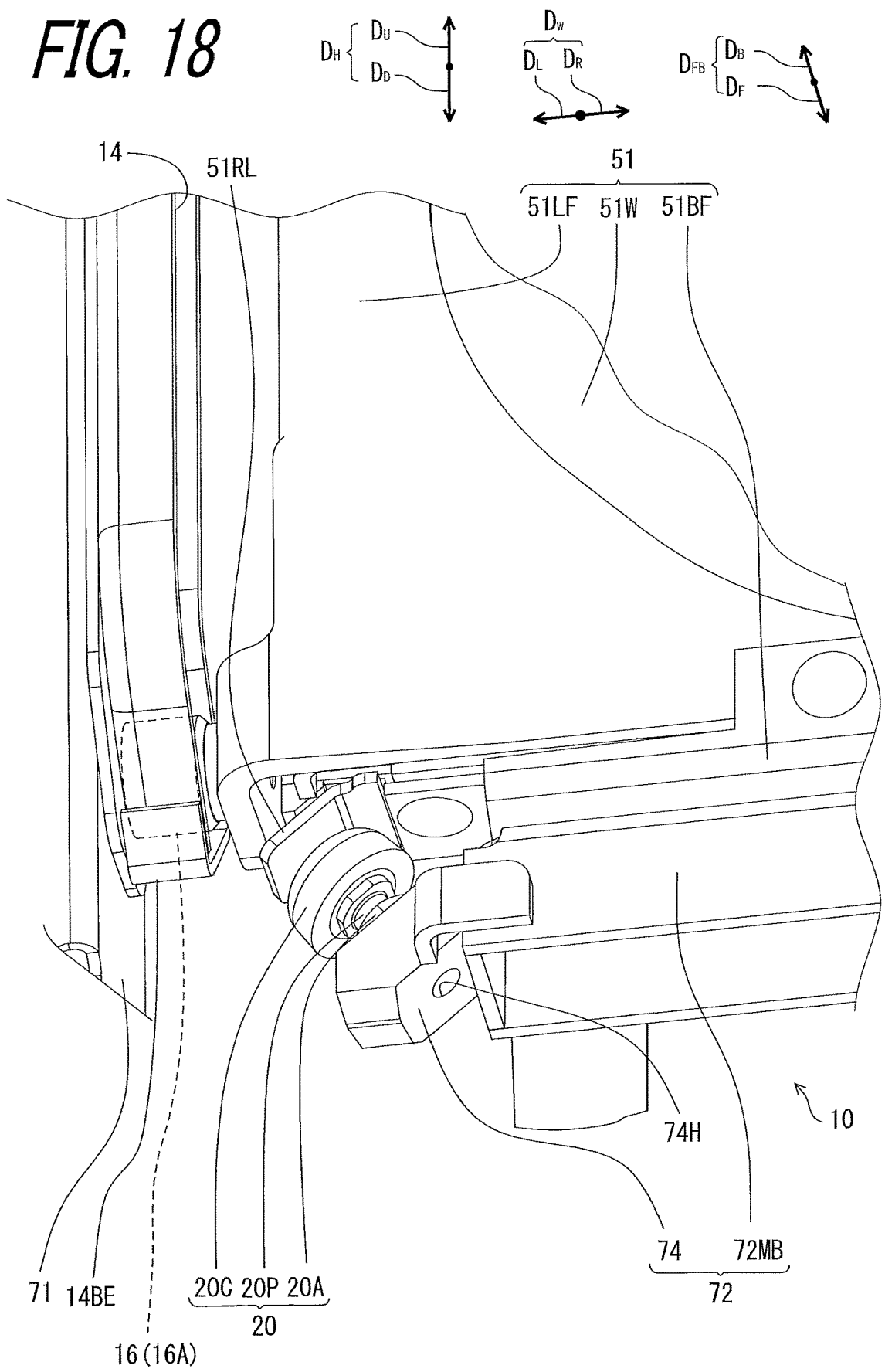
FIG. 18 is an enlarged view of the periphery of the additional window support member when the window is closed.

FIG. 18 is an enlarged perspective view of the vicinity of the additional window support member 20 when the window 5w is closed. Referring to FIGS. 16 through 18, the additional window support member 20 includes an additional abutting member 20C, an additional pin 20P, and an additional adjustment member 20A. The additional abutting member 20C is configured to abut on the windowpane 51. More specifically, the window stabilization mechanism 10 further includes an additional receiving member 51RL provided on the windowpane 51 so as to abut on the additional abutting member 20C in the additional oblique direction $D_{f2}$, and the additional abutting member 20C is configured to abut on the additional receiving member 51RL. Referring to FIG. 18, the additional receiving member 51RL is connected to the window frame 51LF.

The additional pin 20P connects the third cabin frame 72 to the additional abutting member 20C. More specifically, the third cabin frame 72 includes a third cabin frame body 72MB extending in the width direction $D_W$ and an additional connecting member 74 tilting from the third cabin frame body 72MB leftward $D_L$ and downward $D_D$. The additional pin 20P connects the additional abutting member 20C and the additional connecting member 74. The additional connecting member 74 extends in a direction perpendicular to the additional oblique direction $D_{I2}$. The additional adjustment member 20A is connected to the additional pin 20P. As shown in FIG. 17, the additional adjustment member 20A is configured to adjust the distance D2 between the additional abutting member 20C and the third cabin frame 72 in the lengthwise direction of the additional pin 20P (oblique direction $D_{I1}$). Specifically, the additional pin 20P is a rod-like member having screw threads. As shown in FIG. 18, the additional connecting member 74 has a screw hole 74H, and the additional pin 20P is inserted into the screw hole 74H. The additional adjustment member 20A is a nut configured to be screwed with the thread. The diameter of the nut is larger than the diameter of the screw hole 74H. The additional adjustment member 20A can adjust the distance D2 by adjusting the position where the additional adjustment member 20A is screwed with the additional pin 20P.

Operation and Effect of Embodiments

In this embodiment, the window stabilization mechanism 10 includes the lock mechanism 11, the rail 13, the sliding member 15, and the seal mechanism 17. The seal mechanism 17 is provided with a first additional elastic body 17A provided in the internal space 17IS, but the first additional elastic body 17A is not provided in a part of the internal space 17IS of the seal frame body 17F which is positioned in the vicinity of the lock mechanism 11 when the window 5w is closed. Therefore, the seal mechanism 17 can suppress the backlash of the windowpane 51 to the front-rear direction $D_{FB}$ in the region R1 away from the lock mechanism 11, and the seal mechanism 17 does not strongly press the windowpane 51 against the front-rear direction $D_{FB}$ in the region R2 close to the lock mechanism 11, so that the locking by the lock mechanism 11 becomes smooth when the window 5w is closed.

Furthermore, the window stabilization mechanism 10 includes the lock mechanism 11, the rail 13, the sliding member 15, and the window support member 19. The window support member 19 abuts on the windowpane 51 when the window 5w is closed, and presses the windowpane 51 in an oblique direction $D_{I1}$ from the windowpane 51 toward the rail 13 and from the lower end (second end) 13BE of the rail 13 toward the upper end (first end) 13UE of the rail 13 when the windowpane 51 is locked by the lock mechanism 11. Therefore, since the window support member 19 restricts the movement of the windowpane 51 in the width direction $D_W$, the backlash of the windowpane 51 in the width direction $D_W$ can be suppressed.

The window stabilization mechanism 10 further includes the additional lock mechanism 12, the additional rail 14, the additional sliding member 16, and the additional window support member 20. The rail 13 is provided on the first cabin frame 70 provided on the one side (right side $D_R$) of the cabin 5, and the additional rail 14 is provided on the second cabin frame 71 provided on the other side (left side $D_L$) of the cabin 5. The additional window support member 20 abuts on the windowpane 51 when the window 5w is closed, and presses the windowpane 51 in an additional oblique direction $D_{I2}$ from the windowpane 51 toward the additional rail 14 and from the lower end (fourth end) 14BE of the additional rail 14 toward the upper end (third end) 14UE of the additional rail 14 when the windowpane 51 is locked by the additional lock mechanism 12. Therefore, the window support member 19 and the additional window support member 20 are pressed in the opposite direction toward the outside of the width direction $D_W$ of the windowpane 51. Thus, the rattling of the windowpane 51 in the width direction $D_W$ can be suppressed independently of the rail 13 and the additional rail 14 when the window 5w is closed. This is more preferable in the sense that it does not affect the sliding performance of the sliding member 15 and the additional sliding member 16 as compared with a mechanism for suppressing the rattling of the windowpane 51 in the width direction $D_W$ by pressing the windowpane 51 from the outside of the window 5w toward the inside of the window 5w.

Variations of the Embodiments

In the embodiments described above, the window stabilization mechanism 10 may not include the window support member 19 and the additional window support member 20. Alternatively, the window stabilization mechanism 10 may not include a seal mechanism 17 and an additional seal mechanism 18. In the embodiment described above, the lock mechanism 11, the rail 13, the sliding member 15, the seal mechanism 17, the window support member 19, and the receiving member 51RR are provided on the right side of the window 5w, and the additional lock mechanism 12, the additional rail 14, the additional sliding member 16, the additional seal mechanism 18, the additional window support member 20, and the additional receiving member 51RL are provided on the left side of the window 5w. However, the lock mechanism 11, the rail 13, the sliding member 15, the seal mechanism 17, the window support member 19, and the receiving member 51RR may be provided on the left side of the window 5w, and the additional lock mechanism 12, the additional rail 14, the additional sliding member 16, the additional seal mechanism 18, the additional window support member 20, and the additional receiving member 51RL may be provided on the right side of the window 5w.

The window stabilization mechanism 10 of the present embodiment is applicable not only to the rail 13 and the additional rail 14 extending in the height direction $D_H$ but also to the sliding mechanism of the windowpane 51 extending in an arbitrary direction. In addition, the cross-sectional shape of the seal frame body 17F, the cross-sectional shape of the additional seal frame body 18F, the cross-sectional shape of the first additional elastic body 17A, and the cross-sectional shape of the second additional elastic body 18A are not limited to the shapes shown in the embodiments, and can be changed as long as the functions shown in the embodiments are performed.

Figure 19:
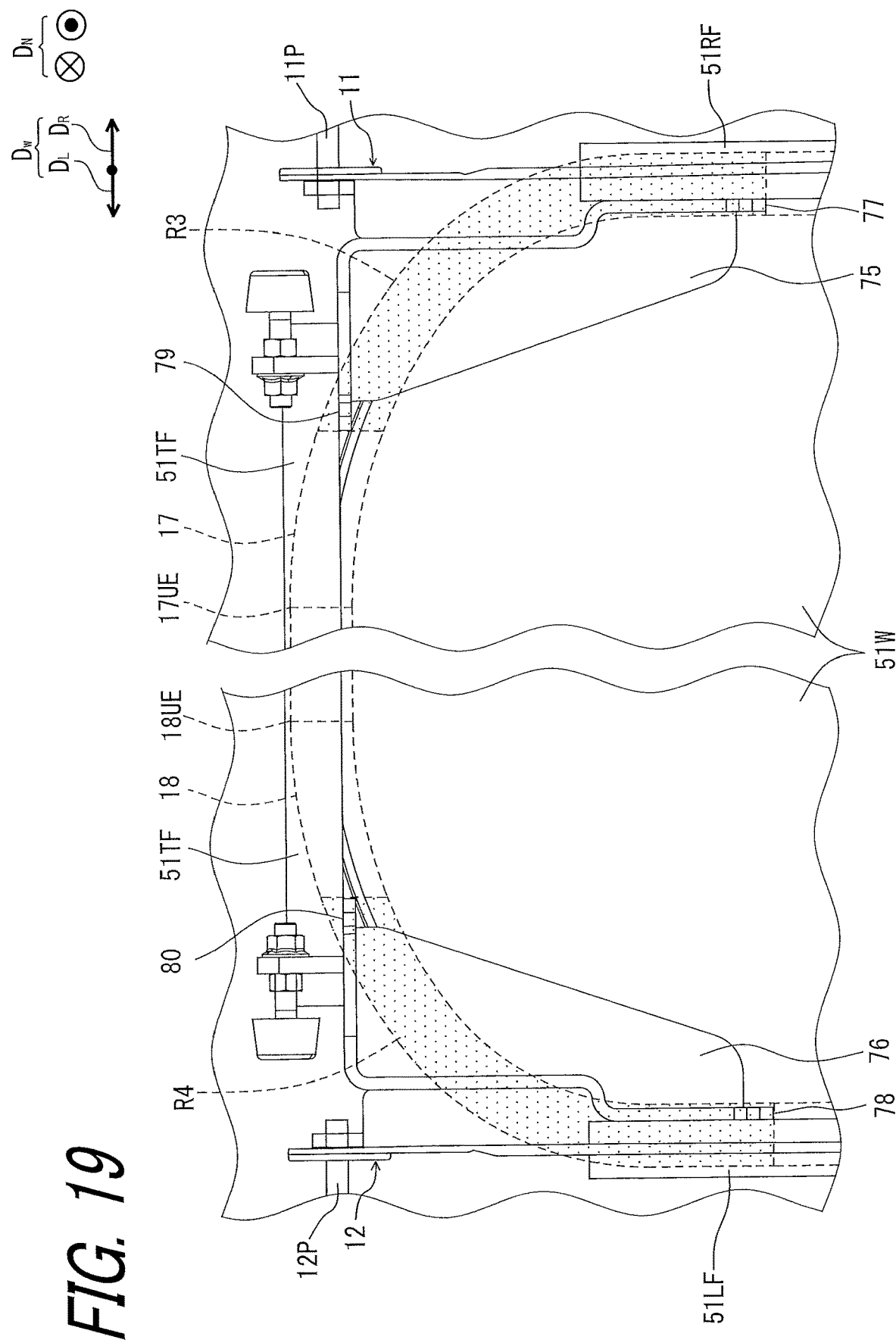
FIG. 19 is a view showing another example of a region where the first additional elastic body and the second additional elastic body are not provided.

The region of the seal frame body 17F where the first additional elastic body 17A is not provided in the internal space 17IS is not limited to the region R2, but may be set to a narrower region. For example, as shown in FIG. 19, a portion R3 may be deemed as the vicinity of the lock mechanism 11, the portion R3 overlapping, as viewed from the normal direction $D_N$ of a surface of the transparent member 51W to abut against the seal mechanism 17 and the additional seal mechanism 18 when the window 5w is closed, the seal mechanism 17 with: a portion 75 connected to the transparent member 51W without being connected to the transparent member 51W via any of the window frame 51TF, 51BF, 51LF, and 51RF; a bracket 77 connecting the lock mechanism 11 and the window frame 51RF; and a bracket 79 connecting the lock mechanism 11 and the window frame 51TF. Near the portion R3, the first additional elastic body 17A may not be provided in the internal space IS of the seal frame body 17F. In other regions, the first additional elastic body 17A may be provided in the internal space 17IS of the seal frame body 17F.

Similarly, the region of the additional seal frame body 18F in which the second additional elastic body 18A is not provided in the additional internal space 18IS is not limited to the region R2 but may be set to a narrower region. For example, as shown in FIG. 19, a portion R4 may be deemed as the vicinity of the additional lock mechanism 12, the portion R4 overlapping, as viewed from the normal direction $D_N$ when the window 5w is closed, the additional seal mechanism 18 with: a portion 76 connected to the transparent member 51W without being connected to the transparent member 51W via any of the window frame 51TF, 51BF, 51LF, and 51RF; a bracket 78 connecting the additional lock mechanism 12 and the window frame 51LF; and the bracket 80 connecting the additional lock mechanism 12 and the window frame 51TF. Near the portion R4, the second additional elastic body 18A may not be provided in the additional internal space 18IS of the additional seal frame body 18F. In other regions, the first additional elastic body 17A may be provided in the additional internal space 18IS of the additional seal frame body 18F.

As used herein, "comprise" and its derivatives are non-limiting terms that describe the presence of a component and do not exclude the presence of other components that are not described. This also applies to "have", "include" and their derivatives.

The terms " . . . member", " . . . part", " . . . element", " . . . body" and " . . . structure" may have multiple meanings, such as a single part or multiple parts.

Ordinal numbers such as "first" and "second" are terms used only to identify structures and do not have other meanings (for example, in a particular order). For example, the existence of "first element" does not imply the existence of "second element" and the existence of "second element" does not imply the existence of "first element".

Terms such as "substantially", "roughly", and "about" may mean a reasonable amount of deviation such that the final result does not vary significantly unless otherwise explained in the embodiments. All figures described herein may be interpreted to include phrases such as "in substance", "roughly", "about" and the like.

The phrase "at least one of A and B" in this application should be interpreted to include only A, only B, and both A and B.

It will be apparent from the above disclosure that various modifications and modifications of the present invention are possible. Accordingly, the present invention may be practiced in a manner different from the specific disclosure of the present invention without departing from the spirit and spirit of the invention.

Obviously, numerous modifications and variations of the present invention are possible in light of the above teachings. It is therefore to be understood that within the scope of the appended claims, the invention may be practiced otherwise than as specifically described herein.

What is claimed is:

1. A window stabilization mechanism comprising:
   a rail provided on a first cabin frame provided on one side of a window of a cabin of a work vehicle and having a first end and a second end opposite the first end in a lengthwise direction of the rail;
   a sliding member provided on a windowpane and configured to slide on the rail to guide the windowpane in accordance with opening and closing of the window, the sliding member being configured to be positioned at the first end when the window is opened and to be positioned at the second end when the window is closed;
   a lock mechanism configured to lock the windowpane against the first cabin frame when the window is closed; and
   a window support member configured to abut against the windowpane when the window is closed and to press the windowpane in an oblique direction from the windowpane toward the rail and from the second end toward the first end when the windowpane is locked by the lock mechanism.

2. The window stabilization mechanism according to claim 1, further comprising:
   an additional rail provided on a second cabin frame opposite to the first cabin frame on another side of the window opposite to the one side, the additional rail having a third end and a fourth end opposite the third end in the lengthwise direction of the rail;
   an additional sliding member provided on the windowpane and configured to slide on the additional rail to guide the windowpane in accordance with opening and closing of the window, the additional sliding member being configured to be positioned at the third end when the window is opened and to be positioned at the fourth end when the window is closed;
   an additional lock mechanism configured to lock the windowpane against the second cabin frame when the window is closed; and
   an additional window support member configured to abut against the windowpane when the window is closed and to press the windowpane in an additional oblique direction from the windowpane toward the additional rail and from the fourth end toward the third end when the windowpane is locked by the lock mechanism.

3. The window stabilization mechanism according to claim 2, wherein
   the additional lock mechanism is positioned adjacent to the third end of the additional rail when the window is closed, and
   the additional window support member is provided adjacent to the fourth end of the additional rail.

4. The window stabilization mechanism according to claim 2, wherein the window support member includes an abutting member to abut against the windowpane, the abutting member being an elastic body, and a pin to connect to the abutting member, a third cabin frame connecting the first cabin frame and the second cabin frame.

5. The window stabilization mechanism of claim 4, wherein the window support member further comprises an adjustment member connected to the pin and configured to adjust a distance between the abutting member and the third cabin frame in a lengthwise direction of the pin.

6. The window stabilization mechanism according to claim 1, wherein the window support member includes an abutting member to abut against the windowpane, the abutting member being an elastic body, and a pin to connect to the abutting member, a third cabin frame connecting the first cabin frame and the second cabin frame.

7. The window stabilization mechanism of claim 6, wherein the window support member further comprises an adjustment member connected to the pin and configured to adjust a distance between the abutting member and the third cabin frame in a lengthwise direction of the pin.

8. The window stabilization mechanism according to claim 7, further comprising a receiving member provided on the windowpane and configured to abut against the abutting member in the oblique direction.

9. The window stabilization mechanism according to claim 6, further comprising a receiving member provided on the windowpane and configured to abut against the abutting member in the oblique direction.

10. The window stabilization mechanism according to claim 1, wherein
the lock mechanism is positioned adjacent to the first end of the rail when the window is closed, and
the window support member is provided adjacent to the second end of the rail.

11. The window stabilization mechanism according to claim 1, wherein the window is a front window of the cabin.

12. A window stabilization mechanism comprising:
a rail mounted on a first cabin frame provided on one side of a window of a cabin of a work vehicle;
a sliding member mounted on a windowpane and configured to slide on the rail to guide the windowpane in accordance with opening and closing of the window;
a seal mechanism mounted on the first cabin frame and configured to seal a gap between the first cabin frame and the windowpane when the window is closed; and
a lock mechanism configured to lock the windowpane to the first cabin frame when the window is closed, the lock mechanism including:
a seal frame body which is elastic and has an internal space; and
a first additional elastic body provided in the internal space such that the first additional elastic body is not provided at a portion of the internal space of the seal frame body which is positioned adjacent to the lock mechanism when the window is closed.

13. The window stabilization mechanism according to claim 12, wherein an elastic modulus of the seal frame body in the front-rear direction of the work vehicle is smaller than an elastic modulus of the seal frame body including the first additional elastic body in the front-rear direction.

14. The window stabilization mechanism according to claim 12, wherein the rail and the first cabin frame extend in a height direction along a height of the work vehicle.

15. The window stabilization mechanism according to claim 14, wherein the lock mechanism is positioned adjacent to an upper end of the rail in the height direction when the window is closed.

16. The window stabilization mechanism according to claim 15, wherein the first additional elastic body is not provided in the internal space within a range of 15% of the height of the seal frame body from the upper end of the seal frame body in the height direction.

17. The window stabilization mechanism according to claim 12, further comprising:
an additional rail mounted on a second cabin frame provided on another side of the window opposite to the one side to face the first cabin frame;
an additional sliding member mounted on the windowpane and configured to slide on the additional rail to guide the windowpane in accordance with opening and closing of the window;
an additional seal mechanism mounted on the second cabin frame and configured to seal a gap between the second cabin frame and the windowpane when the window is closed; and
an additional lock mechanism configured to lock the windowpane against the second cabin frame when the window is closed, the additional seal mechanism including:
an additional seal frame body which is elastic and has an additional internal space; and
a second additional elastic body provided in the additional internal space such that the second additional elastic body is not provided in a portion of the additional internal space of the additional seal frame body which is positioned adjacent to the additional lock mechanism when the window is closed.

18. The window stabilization mechanism according to claim 17, wherein the additional internal space provided with the second additional elastic body has a gap.

19. The window stabilization mechanism according to claim 12, wherein the window is a front window of the cabin.

20. The window stabilization mechanism according to claim 12, wherein the internal space provided with the first additional elastic body has a gap.

* * * * *